(12) United States Patent
Pelletier et al.

(10) Patent No.: US 10,904,733 B2
(45) Date of Patent: *Jan. 26, 2021

(54) ACCESSING LOCAL NETWORKS IN A COMMUNICATIONS NETWORK

(71) Applicant: InterDigital Patent Holdings, Inc., Wilmington, DE (US)

(72) Inventors: Ghyslain Pelletier, Montreal (CA); Diana Pani, Montreal (CA)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 16/113,728

(22) Filed: Aug. 27, 2018

(65) Prior Publication Data

US 2018/0368170 A1  Dec. 20, 2018

Related U.S. Application Data

(63) Continuation of application No. 15/459,703, filed on Mar. 15, 2017, now Pat. No. 10,064,211, which is a
(Continued)

(51) Int. Cl.
*H04W 4/00* (2018.01)
*H04W 4/80* (2018.01)
(Continued)

(52) U.S. Cl.
CPC .......... *H04W 4/80* (2018.02); *G06Q 30/0261* (2013.01); *G06Q 30/0267* (2013.01);
(Continued)

(58) Field of Classification Search
CPC . H04W 72/1289; H04W 8/005; H04W 4/023; H04W 76/023; H04W 48/16; H04W 60/00; G06Q 30/0267; G06Q 30/0261
(Continued)

(56) References Cited

U.S. PATENT DOCUMENTS 7,020,704 B1 * 3/2006 Lipscomb ......... H04L 29/06027
709/217
8,755,323 B2   6/2014 Wang et al.
(Continued)

FOREIGN PATENT DOCUMENTS

CN        101237495      8/2008
CN        101419599      6/2009
(Continued)

OTHER PUBLICATIONS

IEEE P802.11s/D10.0, Draft Standard for Information Technology—Telecommunications and information exchange between systems—Local and metropolitan area networks—Specific Requirements, Part 11: Wireless LAN Medium Access Control (MAC) and Physical Layer (PHY) specifications, Amendment 10: Mesh Networking (Mar. 2011).
(Continued)

*Primary Examiner* — Danh C Le
(74) *Attorney, Agent, or Firm* — Volpe Koenig

(57) ABSTRACT

Methods and apparatuses are described herein. A method may comprise sending, to a cellular network, a registration message. The registration message may include a request for information associated with a local service and a network name associated with the local service, and the service may be associated with an application session. The method may further comprise receiving, from the cellular network based on the registration message and location information of the WTRU, an indication of whether the local service is available and tracking area information for the local service. The method may further comprise determining, based on the tracking area information for the local service, whether the WTRU is in an area of the local service and initiating communication over the application session based on a
(Continued)

determination that the WTRU is in the area of the local service.

14 Claims, 6 Drawing Sheets

Related U.S. Application Data continuation of application No. 14/816,766, filed on Aug. 3, 2015, now abandoned, which is a continuation of application No. 13/605,155, filed on Sep. 6, 2012, now Pat. No. 9,125,012.

(60) Provisional application No. 61/611,905, filed on Mar. 16, 2012, provisional application No. 61/533,047, filed on Sep. 9, 2011.

(51) Int. Cl.
| | | |
|---|---|---|
| *G06Q 30/02* | (2012.01) | |
| *H04L 29/08* | (2006.01) | |
| *H04W 4/029* | (2018.01) | |
| *H04W 12/02* | (2009.01) | |
| *H04W 12/08* | (2009.01) | |
| *H04W 76/14* | (2018.01) | |
| *H04W 4/02* | (2018.01) | |
| *H04W 48/12* | (2009.01) | |
| *H04W 48/20* | (2009.01) | |
| *H04W 8/00* | (2009.01) | |

(52) U.S. Cl.
CPC ............ *H04L 67/26* (2013.01); *H04W 4/023* (2013.01); *H04W 4/029* (2018.02); *H04W 12/02* (2013.01); *H04W 12/08* (2013.01); *H04W 76/14* (2018.02); *H04W 8/005* (2013.01); *H04W 48/12* (2013.01); *H04W 48/20* (2013.01)

(58) Field of Classification Search
USPC .................. 455/435.1, 550.1, 456.5; 705/40
See application file for complete search history.

(56) References Cited

U.S. PATENT DOCUMENTS

| | | | |
|---|---|---|---|
| 8,873,411 B2 | 10/2014 | Backholm et al. | |
| 2002/0087266 A1 | 7/2002 | Sugimoto | |
| 2003/0143988 A1 | 7/2003 | Jamadagni et al. | |
| 2004/0015575 A1* | 1/2004 | Motoyama | H04W 48/14 709/222 |
| 2004/0203385 A1 | 10/2004 | Narayanan et al. | |
| 2004/0264424 A1* | 12/2004 | Hirsbrunner | H04W 36/0066 370/338 |
| 2005/0153692 A1 | 7/2005 | Hwang et al. | |
| 2005/0187873 A1 | 8/2005 | Labrou | |
| 2005/0243777 A1* | 11/2005 | Fong | H04L 12/66 370/338 |
| 2006/0276137 A1* | 12/2006 | Pummill | H04L 63/0853 455/67.11 |
| 2007/0026871 A1 | 2/2007 | Wager | |
| 2007/0099653 A1* | 5/2007 | Parron | H04W 76/19 455/552.1 |
| 2008/0040702 A1* | 2/2008 | Sciacero | G06F 8/34 717/100 |
| 2008/0207170 A1* | 8/2008 | Khetawat | H04W 60/005 455/411 |
| 2008/0243861 A1* | 10/2008 | Wassingbo | G06F 16/434 |
| 2008/0256218 A1* | 10/2008 | Kinoshita | H04N 7/17318 709/219 |
| 2008/0285492 A1* | 11/2008 | Vesterinen | H04W 76/12 370/310 |
| 2008/0285523 A1 | 11/2008 | Bjorken | |
| 2009/0061890 A1 | 3/2009 | Andreasson et al. | |
| 2009/0168741 A1 | 7/2009 | Masuda | |
| 2009/0245194 A1 | 10/2009 | Damnjanovic et al. | |
| 2009/0245202 A1* | 10/2009 | Gras | H04W 76/22 370/331 |
| 2009/0247158 A1* | 10/2009 | Hara | H04W 48/20 455/434 |
| 2010/0009657 A1 | 1/2010 | Dingler | |
| 2010/0057924 A1 | 3/2010 | Rauber et al. | |
| 2010/0067468 A1 | 3/2010 | Ho et al. | |
| 2010/0074475 A1* | 3/2010 | Chouno | A61B 5/055 382/107 |
| 2010/0099435 A1 | 4/2010 | Druzinic-Fiebach et al. | |
| 2010/0125661 A1 | 5/2010 | Perala et al. | |
| 2010/0128677 A1* | 5/2010 | Liu | H04L 69/22 370/328 |
| 2010/0130232 A1 | 5/2010 | Dingler | |
| 2010/0161720 A1 | 6/2010 | Colligan et al. | |
| 2010/0208658 A1* | 8/2010 | Vesterinen | H04W 8/082 370/328 |
| 2010/0234017 A1* | 9/2010 | Lim | H04L 12/2836 455/426.1 |
| 2010/0316025 A1 | 12/2010 | Brandt et al. | |
| 2010/0323743 A1 | 12/2010 | Huan | |
| 2010/0325194 A1 | 12/2010 | Williamson | |
| 2011/0038299 A1 | 2/2011 | Sugawara et al. | |
| 2011/0065451 A1 | 3/2011 | Danado et al. | |
| 2011/0189971 A1* | 8/2011 | Faccin | H04W 76/10 455/404.1 |
| 2011/0235546 A1* | 9/2011 | Horn | H04L 12/66 370/254 |
| 2011/0235605 A1* | 9/2011 | Yeoum | H04W 72/04 370/329 |
| 2011/0240747 A1* | 10/2011 | Stewart | F16J 15/064 235/492 |
| 2011/0256879 A1 | 10/2011 | Chun et al. | |
| 2011/0268022 A1* | 11/2011 | Xu | H04Q 3/0025 370/328 |
| 2011/0269422 A1* | 11/2011 | Xu | H04W 4/24 455/411 |
| 2011/0269472 A1* | 11/2011 | Xu | H04W 40/02 455/445 |
| 2011/0270747 A1* | 11/2011 | Xu | G06Q 20/102 705/40 |
| 2011/0299483 A1 | 12/2011 | Wu | |
| 2012/0063388 A1* | 3/2012 | Ruparelia | H04W 40/02 370/328 |
| 2012/0064891 A1* | 3/2012 | Wijayanathan | H04W 4/021 455/435.1 |
| 2012/0173402 A1 | 7/2012 | Nicolaidis | |
| 2012/0190386 A1 | 7/2012 | Anderson | |
| 2012/0246730 A1* | 9/2012 | Raad | H04L 61/1511 726/25 |
| 2012/0269162 A1* | 10/2012 | Vesterinen | H04W 8/082 370/331 |
| 2012/0278385 A1 | 11/2012 | Papakipos | |
| 2012/0278475 A1 | 11/2012 | Papakipos | |
| 2012/0278641 A1 | 11/2012 | Papakipos | |
| 2012/0331156 A1* | 12/2012 | Colpitts | H04L 12/2818 709/227 |
| 2013/0003678 A1 | 1/2013 | Quan et al. | |
| 2013/0010711 A1 | 1/2013 | Larsson et al. | |
| 2013/0188547 A1* | 7/2013 | Moriwaki | H04W 28/06 370/312 |
| 2014/0038653 A1 | 2/2014 | Mildh et al. | |
| 2014/0247816 A1 | 9/2014 | Kim et al. | |
| 2014/0348152 A1* | 11/2014 | Vanderhulst | H04W 4/00 370/338 |
| 2015/0126208 A1 | 5/2015 | Yu et al. | |
| 2015/0229779 A1* | 8/2015 | Goermer | H04M 15/43 370/259 |

FOREIGN PATENT DOCUMENTS

| | | |
|---|---|---|
| JP | 2003-153322 | 5/2003 |
| JP | 2003-264868 | 9/2003 |
| JP | 2009-017101 | 1/2009 |

(56) References Cited

FOREIGN PATENT DOCUMENTS

| WO | 08/069553 | 6/2008 |
|---|---|---|
| WO | 08/109866 | 9/2008 |
| WO | 10/097645 | 9/2010 |
| WO | 10/108136 | 9/2010 |
| WO | 10/111476 | 9/2010 |
| WO | 11/047353 | 4/2011 |
| WO | 11/098128 | 8/2011 |

OTHER PUBLICATIONS

IEEE Standard for Information technology—Telecommunications and information exchange between systems—Local and metropolitan area networks— Specific requirements; Part 11: Wireless LAN Medium Access Control (MAC) and Physical Layer (PHY) Specifications, IEEE Std. 802.11-2012 (Mar. 29, 2012).
IEEE Std 802.16-2012, IEEE Standard for Air Interface for Broadband Wireless Access Systems, IEEE Computer Society and the IEEE Microwave Theory and Techniques Society (Aug. 17, 2012).
IEEE Std 802.16m-2011, IEEE Standard for Local and metropolitan area networks—Part 16: Air Interface for Broadband Wireless Access Systems, Amendment 3: Advanced Air Interface (May 6, 2011).
IEEE Std 802.20-2008, IEEE Standard for Local and metropolitan area networks, Part 20: Air Interface for Mobile Broadband Wireless Access Systems Supporting Vehicular Mobility—Physical and Media Access Control Layer Specification (Aug. 29, 2008).
Intel Corporation, "Discussions on Carrier Aggregation Across LTE and WIFI," RP-111094, 3GPP TSG-RAN Meeting #53, Fukuoka, Japan, Sep. 13-16, 2011.
Intel Corporation, Vodafone, "New Study Item Proposal for Radio Level Dynamic Flow Switching Between 3GPP-LTE and WLAN," RP-111104, 3GPP TSG RAN#53, Fukuoka, Japan, Sep. 13-16, 2011.
Qualcomm Incorporated, "On the Need for a 3GPP Study on LTE Device-to-Device Discovery and Communication," RP-100706, 3GPP TSG-RAN #52, Bratislava, Slovakia, May 31-Jun. 3, 2011.
Qualcomm Incorporated, "Study on LTE Device to Device Discovery and Communication—Radio Aspects," TSG-RAN #53, Tdoc RP-111093, Fukoka, Japan (Sep. 13-16, 2011).
Third Generation Partnership Project, "Technical Specification Group Radio Access Network; Evolved Universal Terrestrial Radio Access (E-UTRA); Multiplexing and Channel Coding (Release 8)," 3GPP TS 36.212 v8.8.0, Dec. 2009.
Third Generation Partnership Project, "Technical Specification Group Radio Access Network; Evolved Universal Terrestrial Radio Access (E-UTRA); Multiplexing and Channel Coding (Release 9)," 3GPP TS 36.212 v9.3.0, Oct. 2010.
Third Generation Partnership Project, "Technical Specification Group Radio Access Network; Evolved Universal Terrestrial Radio Access (E-UTRA); Multiplexing and Channel Coding (Release 9)," 3GPP TS 36.212 v9.4.0, Sep. 2011.
Third Generation Partnership Project, "Technical Sepecification Group Access Network; Evolved Universal Terrestrial Radio Access (E-UTRA); Multiplexing and Channel Coding (Release 10)," 3GPP TS 36.212 v10.2.0, Jun. 2011.
Third Generation Partnership Project, "Technical Specification Group Radio Access Network; Evolved Universal Terrestrial Radio Access (E-UTRA); Multiplexing and Channel Coding (Release 10)," 3GPP TS 36.212 v10.6.0, Jun. 2012.
Third Generation Partnership Project, "Technical Specification Group Radio Access Network; Evolved Universal Terrestrial Radio Access (E-UTRA); Physical Layer Procedures (Release 8)," 3GPP TS 36.213 v8.8.0, Sep. 2009.
Third Generation Partnership Project, "Technical Specification Group Radio Access Network; Evolved Universal Terrestrial Radio Access (E-UTRA); Physical Layer Procedures (Release 9)," 3GPP TS 36.213 v9.3.0, Oct. 2010.
Third Generation Partnership Project, "Technical Specification Group Radio Access Network; Evolved Universal Terrestrial Radio Access (E-UTRA); Physical Layer Procedures (Release 10)," 3GPP TS 36.213 v10.2.0, Jun. 2011.
Third Generation Partnership Project, "Technical Specification Group Radio Access Network; Evolved Universal Terrestrial Radio Access (E-UTRA); Physical Layer Procedures (Release 10)," 3GPP TS 36.213 v10.6.0, Jun. 2012.
Third Generation Partnership Project, "Technical Specification Group Radio Access Network; Evolved Universal Terrestrial Radio Access (E-UTRA); Medium Access Control (MAC) Protocal Specificaion (Release 8)," 3GPP TS 36.321 v.8.9.0, Jun. 2010.
Third Generation Partnership Project, "Technical Specification Group Radio Access Network; Evolved Universal Terrestrial Radio Access (E-UTRA); Medium Access Control (MAC) Protocol Specification (Release 8)," 3GPP TS 36.321 v.8.12.0, Mar. 2012.
Third Generation Partnership Project, "Technical Specification Group Radio Access Network; Evolved Universal Terrestrial Radio Access (E-UTRA); Medium Access Control (MAC) Protocol Specification (Release 9)," 3GPP TS 36.321 v9.3.0, Jun. 2010.
Third Generation Partnership Project, "Technical Specification Group Radio Access Network; Evolved Universal Terrestrial Radio Access (E-UTRA); Medium Access Control (MAC) Protocol Specification (Release 9)," 3GPP TS 36.321 v9.6.0, Mar. 2012.
Third Generation Partnership Project, "Technical Specification Group Radio Access Network; Evolved Universal Terrestrial Radio Access (E-UTRA); Medium Access Control (MAC) Protocol Specification (Release 10)," 3GPP TS 36.321 v10.2.0, Jun. 2011.
Third Generation Partnership Project, "Technical Specification Group Radio Access Network; Evolved Universal Terrestrial Radio Access (E-UTRA); Medium Access Control (MAC) Protocol Specification (Release 10)," 3GPP TS 36.321 v10.5.0, Mar. 2012.
Third Generation Partnership Project, "Technical Specification Group Radio Access Network; Evolved Universal Terrestrial Radio Access (E-UTRA); Radio Resource Control (RRC); Protocol Specification (Release 8)," 3GPP TS 36.331 v8.14.0, Jun. 2011.
Third Generation Partnership Project, "Technical Specification Group Radio Access Network; Evolved Universal Terrestrial Radio Access (E-UTRA); Radio Resource Control (RRC); Protocol Specification (Release 8)," 3GPP TS 36.331 v8.17.0, Jul. 2012.
Third Generation Partnership Project, "Technical Specification Group Radio Access Network; Evolved Universal Terrestrial Radio Access (E-UTRA); Radio Resource Control (RRC); Protocol Specification (Release 9)," 3GPP TS 36.331 v9.7.0, Jun. 2011.
Third Generation Partnership Project, "Technical Specification Group Radio Access Network; Evolved Universal Terrestrial Radio Access (E-UTRA); Radio Resource Control (RRC); Protocol Specification (Release 9)," 3GPP TS 36.331 v9.11.0, Jul. 2012.
Third Generation Partnership Project, "Technical Specification Group Radio Access Network; Evolved Universal Terrestrial Radio Access (E-UTRA); Radio Resource Control (RRC); Protocol Specification (Release 10)," 3GPP TS 36.331 v10.2.0, Jun. 2011.
Third Generation Partnership Project, "Technical Specification Group Radio Access Network; Evolved Universal Terrestrial Radio Access (E-UTRA); Radio Resource Control (RRC); Protocol Specification (Release 10)," 3GPP TS 36.331 v10.6.0, Jul. 2012.
Third Generation Partnership Project, "Technical Specification Group Radio Access Network; Evolved Universal Terrestrial Radio Access (E-UTRA); Radio Resource Control (RRC); Protocol Specification (Release 11)," 3GPP TS 36.331 v11.0.0, Jul. 2012.
Third Generation Partnership Project, "Technical Specification Group Radio Access Network; Evolved Universal Terrestrial Radio Access (E-UTRA); LTE Positioning Protocol (LPP) (Release 9)," 3GPP TS 36.355 v9.6.0, Jun. 2011.
Third Generation Partnership Project, "Technical Specification Group Radio Access Network; Evolved Universal Terrestrial Radio Access (E-UTRA), LTE Positioning Protocol (LPP) (Release 9)," 3GPP TS 36.355 v.9.8.0, Dec. 2011.
Third Generation Partnership Project, "Technical Specification Group Radio Access Network; Evolved Universal Terrestrial Radio Access (E-UTRA), LTE Positioning Protocol (LPP) (Release 10)," 3GPP TS 36.355 v10.2.0, Jun. 2011.

(56) References Cited

OTHER PUBLICATIONS

Third Generation Partnership Project, "Technical Specification Group Radio Access Network; Evolved Universal Terrestrial Radio Access (E-UTRA), LTE Positioning Protocol (LPP) (Release 10)," 3GPP TS 36.355 v10.5.0, Jul. 2012.
Third Generation Partnership Project, "Technical Specification Group Services and System Aspects, 3GPP System to Wireless Local Area Network (WLAN) Interworking; System Description (Release 6)," 3GPP TS 23.234 v6.10.0, Oct. 2006.
Third Generation Partnership Project, "Technical Specification Group Services and System Aspects; 3GPP System to Wireless Local Area Network (WLAN) Interworking; System Description (Release 7)," 3GPP TS 23.234 v7.7.0, Jun. 2008.
Third Generation Partnership Project, "Technical Specification Group Services and System Aspects; 3GPP System to Wireless Local Area Network (WLAN) Interworking; System Description (Release 8)," 3GPP TS 23.234 v8.0.0, Dec. 2008.
Third Generation Partnership Project, "Technical Specification Group Services and System Aspects; 3GPP System to Wireless Local Area Network (WLAN) Interworking; System Description (Release 9)," 3GPP TS 23.234 v9.0.0, Dec. 2009.
Third Generation Partnership Project, "Technical Specification Group Services and System Aspects; 3GPP System to Wireless Local Area Network (WLAN) Interworking; System Description (Release 10)," 3GPP TS 23.234 v10.0.0, Mar. 2011.
Third Generation Partnership Project, "Technical Specification Group Services and System Aspects; Architecture Enhancements for Non-3GPP Accesses (Release 8)," 3GPP TS 23.402 v8.9.0, Jun. 2010.
Third Generation Partnership Project, "Technical Specification Group Services and System Aspects; Architecture Enhancements for Non-3GPP Accesses (Release 8)," 3GPP TS 23.402 v8.10.0, Mar. 2012.
Third Generation Partnership Project, "Technical Specification Group Services and System Aspects; Architecture Enhancements for Non-3GPP Accesses (Release 9)," 3GPP TS 23.402 v9.9.0, Jun. 2011.
Third Generation Partnership Project, "Technical Specification Group Services and System Aspects; Architecture Enhancements for Non-3GPP Accesses (Release 9)," 3GPP TS 23.402 v9.12.0, Mar. 2012.
Third Generation Partnership Project, "Technical Specification Group Services and System Aspects; Architecture Enhancements for Non-3GPP Accesses (Release 10)," 3GPP TS 23.402 v10.4.0, Jun. 2011.
Third Generation Partnership Project, "Technical Specification Group Services and System Aspects; Architecture Enhancements for Non-3GPP Accesses (Release 10)," 3GPP TS 23.402 v10.7.0, Mar. 2012.
Third Generation Partnership Project, "Technical Specification Group Services and System Aspects; Architecture Enhancements for Non-3GPP Accesses (Release 11)," 3GPP TS 23.402 v11.3.0, Jun. 2012.
Third Generation Partnership Project, "Technical Specification Group Services and System Aspects, IP Flow Mobility and Seamless Wireless Local Area Network (WLAN) Offload; Stage 2 (Release 10)," 3GPP TS 23.261 v10.1.0, Sep. 2010.
Third Generation Partnership Project, "Technical Specification Group Services and System Aspects; IP Flow Mobility and Seamless Wireless Local Area Network (WLAN) Offload; Stage 2 (Release 10)," 3GPP TS 23.261 v10.2.0, Mar. 2012.
Third Generation Partnership Project, "Technical Specification Group Core Network and Terminals; Mobility Management Base on Dual-Stack Mobile IPv6; Stage 3 (Release 8)," 3GPP TS 24.303 v8.7.0, Sep. 2010.
Third Generation Partnership Project, "Technical Specification Group Core Network and Terminals; Mobility Management Base on Dual-Stack Mobile IPv6; Stage 3 (Release 8)," 3GPP TS 24.303 v.8.9.0, Jun. 2012.
Third Generation Partnership Project, "Technical Specification Group Core Network and Terminals; Mobility Management Base on Dual-Stack Mobile IPv6; Stage 3 (Release 9)," 3GPP TS 24.303 v9.3.0, Sep. 2010.
Third Generation Partnership Project, "Technical Specification Group Core Network and Terminals; Mobility Management Base on Dual-Stack Mobile IPv6; Stage 3 (Release 9)," 3GPP TS 24.303 v9.5.0, Jun. 2012.
Third Generation Partnership Project, "Technical Specification Group Core Network and Terminals; Mobility Management Base on Dual-Stack Mobile IPv6; Stage 3 (Release 10)," 3GPP TS 24.303 v10.3.0, Jun. 2011.
Third Generation Partnership Project, "Technical Specification Group Core Network and Terminals; Mobility Management Base on Dual-Stack Mobile IPv6; Stage 3 (Release 10)," 3GPP TS 24.303 v10.6.0, Jun. 2012.
Third Generation Partnership Project, "Technical Specification Group Core Network and Terminals; Mobility Management Base on Dual-Stack Mobile IPv6; Stage 3 (Release 11)," 3GPP TS 24.303 v11.2.0, Jun. 2012.
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.7.0 (Mar. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.9.0 (Dec. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.4.0 (Jun. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.8.0 (Jun. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.2.0 (Jun. 2012).
Third Generation Partnership Project, "Technical Specification Group Radio Access Network; Evolved Universal Terrestrial Radio Access (E-UTRA); LTE Positioning Protocol (LPP) (Release 10)," 3GPP TS 36.355 V10.5.0 (Jun. 2012).
Third Generation Partnership Project, "Technical Specification Group SA; Feasibility Study for Proximity Services (ProSe) (Release 12)," 3GPP TR 22.803 V0.5.0 (Aug. 2012).
TSG SA WG1, "WID on Proposal for a study on Proximity-based Services," 3GPP TSG SA Plenary Meeting #53, SP-110638, Fukuoka, Japan (Sep. 19-21, 2011).

* cited by examiner

ACCESSING LOCAL NETWORKS IN A COMMUNICATIONS NETWORK

CROSS REFERENCE TO RELATED APPLICATIONS

This application is a continuation of U.S. patent application Ser. No. 15/459,703 filed Mar. 15, 2017, which is a continuation of U.S. patent application Ser. No. 14/816,766 filed Aug. 3, 2015, now abandoned, which is a continuation of U.S. patent application Ser. No. 13/605,155 filed Sep. 6, 2012, which issued as U.S. Pat. No. 9,125,012 on Sep. 1, 2015, which claims the benefit of U.S. Provisional Patent Application No. 61/533,047, which was filed on Sep. 9, 2011, and U.S. Provisional Patent Application No. 61/611,905, which was filed on Mar. 16, 2012, the contents of which are hereby incorporated by reference herein as if fully set forth.

BACKGROUND

A location of a wireless transmit/receive unit (WTRU) may be determined using any number of different methods. One method commonly used for long term evolution (LTE) is satellite assisted positioning, such as assisted global positioning system (GPS) (A-GPS). Satellite assisted positioning may require GPS reception from four satellites and is generally suitable for outdoor use. Another method commonly used for LTE is cell-based positioning. Cell-based positioning makes use of a server with knowledge of the geographical location of the cell, timing alignment measurements to determine a device's distance from the eNB's antenna, and neighbor cell measurements to refine the accuracy. As with satellite assisted positioning, cell-based positioning is generally suitable for outdoor use. Another method commonly used for LTE is observed time difference of arrival (OTDOA) (also referred to as terrestrial GPS). OTDOA may require reception from three different e-NodeBs (eNBs), and positioning using OTDOA is based on the received timing difference from two cells relative to the serving cell of the device. OTDOA is suitable for both indoor and outdoor use. Typically, when a combination of A-GPS and one of the LTE fallback methods is used, the probability of accuracy within 150 m is 95% but drops to 78% for 50 m.

For positioning in LTE, LTE typically provides a connection between the WTRU and a positioning server (LCS). The positioning server may request the WTRU to provide its location or, alternatively, may provide location information to the WTRU, depending on the method used and the device's capabilities. The positioning server may provide a list of potential neighbor cells to search and assist in signal reception. The LTE positioning protocol (LPP), as specified in 3GPP TS 36.355, may be used. The LPP includes a container mechanism for transport of additional information. The LCS may be located anywhere in the network.

Other methods of determining the location of a WTRU may be used for other technologies. One other method is Wifi-based positioning, which is one of the positioning methods used by Google maps. Wifi-based positioning makes use of a server with knowledge of the geographical location of the Wifi transmitter and the service set identification (SSID). Neighbor SSIDs may be used to refine the accuracy. Wifi-based positioning is suitable for both indoor and outdoor use (although its range may be limited by the range of the Wifi technology in use). Another method is user provided positioning. For user-provided positioning, a user may manually enter a location for use by an application. Another method is satellite-based positioning, such as pure GPS positioning at the application. Satellite-based positioning may require GPS reception from four satellites and is generally suitable for outdoor use. Another method is internet protocol (IP) address-based positioning. IP address-based positioning makes use of a server that has knowledge of the geographical location of IP subnets. This method may be limited by network address translators (NATs), virtual private networks (VPNs) and other tunneling mechanisms. One other method is near location-based services positioning, such as radio frequency (RF) ID (RFID), Bluetooth and infrared. Near location-based services positioning may require use of multiple devices with in-built location parameters, GPS modules and/or a server with knowledge of the geographical location of the devices.

SUMMARY

Methods of wireless communication and wireless transmit/receive units (WTRUs) are described. A WTRU includes a processor. The processor determines a location of the WTRU and whether an application is available to the WTRU based on the determined location of the WTRU. On a condition that the application is determined to be available to the WTRU based on the determined location of the WTRU, the processor initiates access to an application service hosting the application.

BRIEF DESCRIPTION OF THE DRAWINGS

A more detailed understanding may be had from the following description, given by way of example in conjunction with the accompanying drawings wherein.

DETAILED DESCRIPTION

Figure 1A:
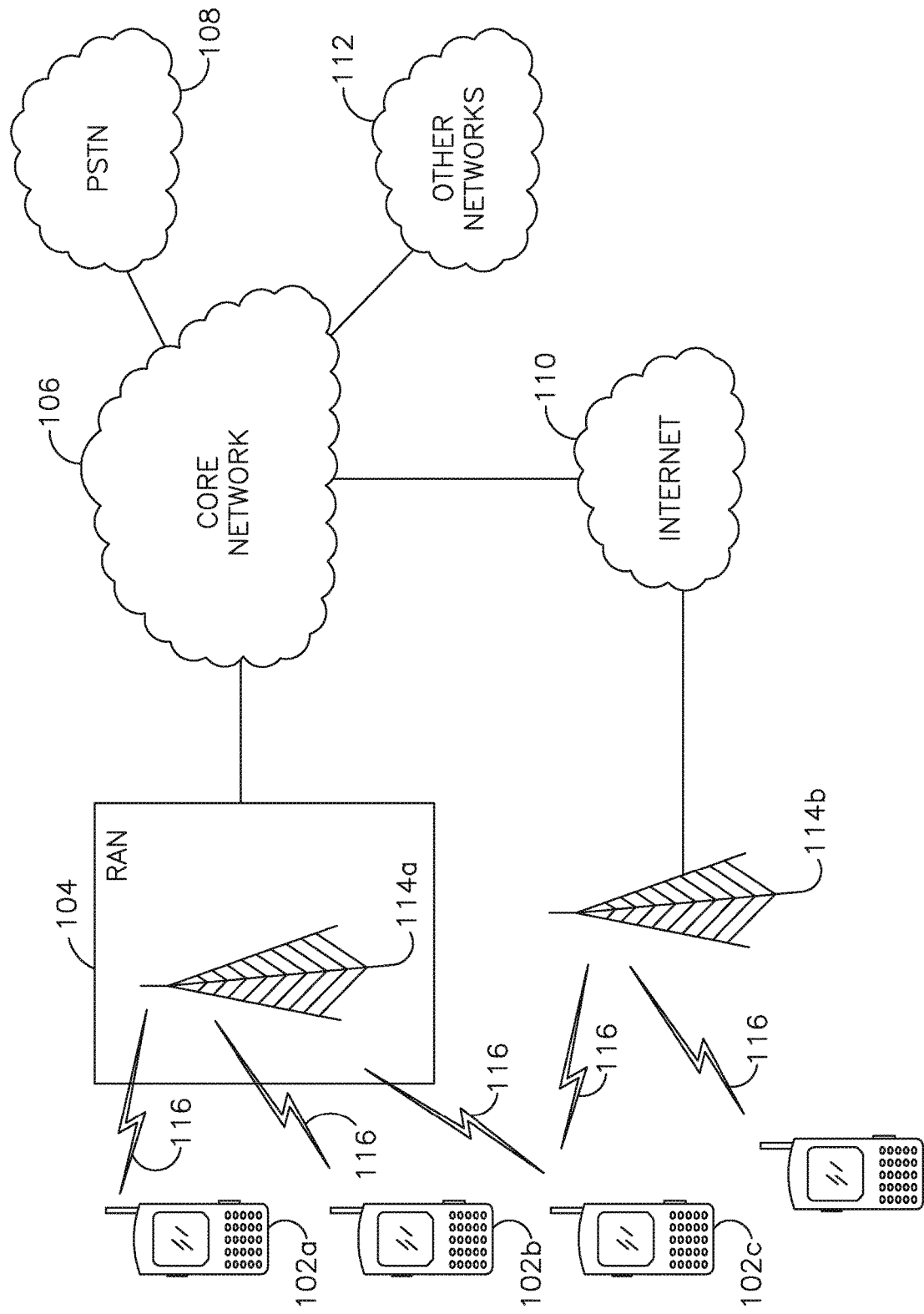
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, or broadcast to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), or relay nodes. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), or visible light). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, or LTE-A) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
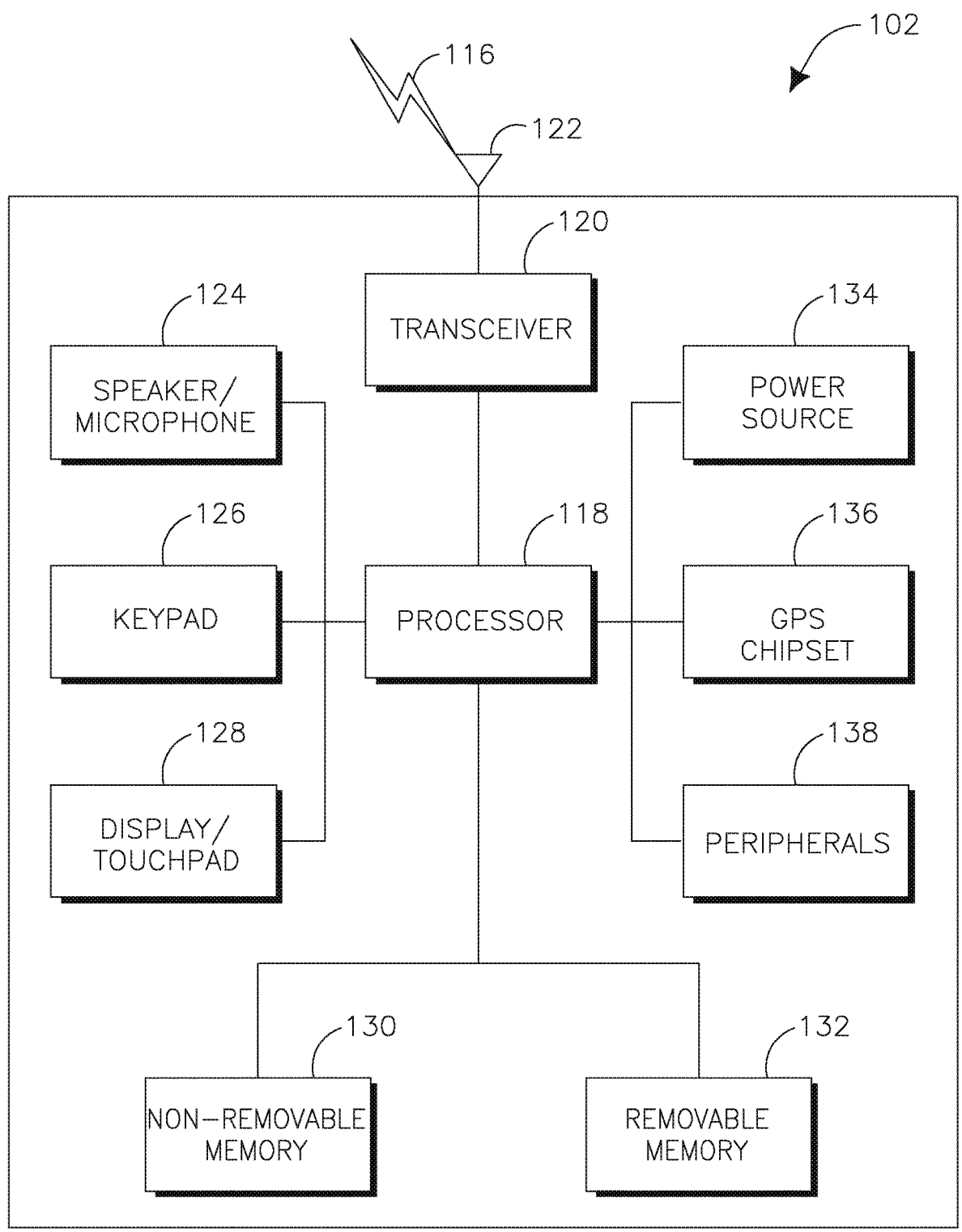
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), or lithium-ion (Li-ion)), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
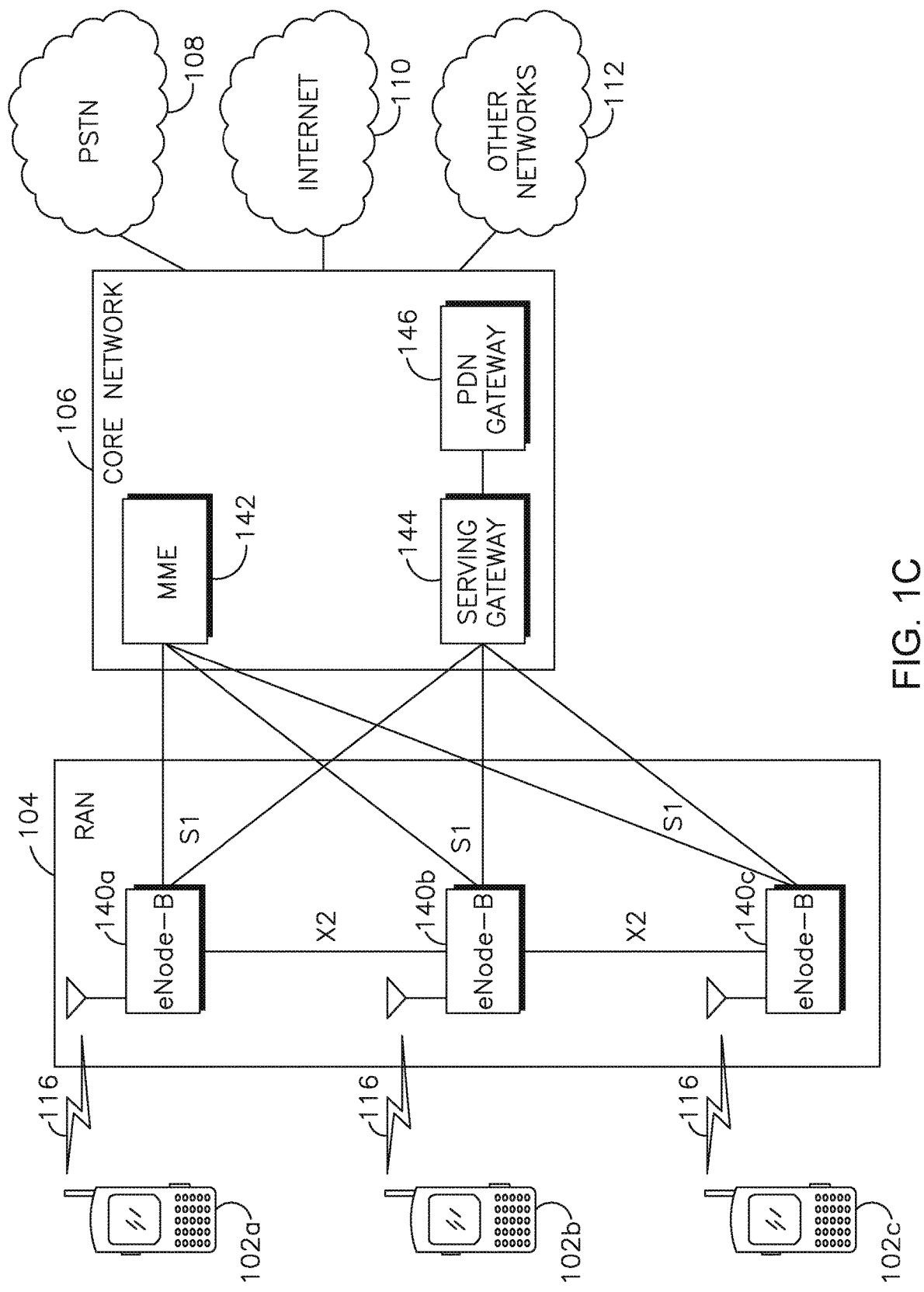
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102*a*.

Each of the eNode-Bs 140*a*, 140*b*, 140*c* may be associated with a particular cell (not shown) and may be configured to handle radio resource management decisions, handover decisions, scheduling of users in the uplink and/or downlink, and the like. As shown in FIG. 1C, the eNode-Bs 140*a*, 140*b*, 140*c* may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142*a*, 142*b*, 142*c* in the RAN 104 via an S1 interface and may serve as a control node. For example, the MME 142 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 142 may also provide a control plane function for switching between the RAN 104 and other RANs (not shown) that employ other radio technologies, such as GSM or WCDMA.

The serving gateway 144 may be connected to each of the eNode Bs 140*a*, 140*b*, 140*c* in the RAN 104 via the S1 interface. The serving gateway 144 may generally route and forward user data packets to/from the WTRUs 102*a*, 102*b*, 102*c*. The serving gateway 144 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 144 may also be connected to the PDN gateway 146, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 106 may facilitate communications with other networks. For example, the core network 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102*a*, 102*b*, 102*c* with access to the networks 112, which may include other wired or wireless networks that are owned and/or operated by other service providers.

3GPP LTE Releases 8, 9, 10 and 11 operating with a single serving cell (LTE R8+) supports up to 100 Mbps in the downlink (DL) and 50 Mbps in the uplink (UL) for a 2×2 configuration. The LTE DL transmission scheme is based on an OFDMA air interface. For the purpose of flexible deployment, LTE R8+ systems support scalable transmission bandwidths, for example, one of 1.4, 2.5, 5, 10, 15 or 20 MHz.

In LTE R8+ (also applicable to LTE R10+ with carrier aggregation), each radio frame (10 ms) may include 10 equally sized sub-frames of 1 ms. Each sub-frame may include 2 equally sized timeslots of 0.5 ms each. There may be either 7 or 6 OFDM symbols per timeslot. 7 symbols per timeslot may be used with a normal cyclic prefix length, and 6 symbols per timeslot may be used in an alternative system configuration with the extended cyclic prefix length. The sub-carrier spacing for the system of LTE Releases 8 and 9 is 15 kHz. An alternative reduced sub-carrier spacing mode using 7.5 kHz is also possible.

A resource element (RE) may correspond to precisely 1 sub-carrier during 1 OFDM symbol interval. 12 consecutive sub-carriers during a 0.5 ms timeslot may constitute 1 resource block (RB). Therefore, with 7 symbols per timeslot, each RB may include 84 REs. A DL carrier may include a scalable number of RBs ranging from a minimum of 6 RBs up to a maximum of 110 RBs. This may correspond to an overall scalable transmission bandwidth of roughly 1 MHz up to 20 MHz. However, a set of common transmission bandwidths may be specified (e.g., 1.4, 3, 5, 10 or 20 MHz).

The basic time-domain unit for dynamic scheduling is one sub-frame including two consecutive timeslots. This may be referred to as a resource-block pair. Certain sub-carriers on some OFDM symbols may be allocated to carry pilot signals in the time-frequency grid. A given number of sub-carriers at the edges of the transmission bandwidth may not be transmitted in order to comply with spectral mask requirements.

For LTE, the DL physical channels may include, for example, a physical control format indicator channel (PCFICH), a physical hybrid automatic repeat request (HARQ) indicator channel (PHICH), a physical data control channel (PDCCH), a physical multicast data channel (PMCH) and a physical data shared channel (PDSCH). On the PCFICH, the WTRU may receive control data indicating the size of the control region of the DL CC. On the PHICH, the WTRU may receive control data indicating HARQ acknowledgement/negative acknowledgement (HARQ A/N, HARQ ACK/NACK or HARQ-ACK) feedback for a previous UL transmission. On the PDCCH, the WTRU may receive DL control information (DCI) messages, which may be used to schedule DL and UL resources. On the PDSCH, the WTRU may receive user and/or control data. For example, a WTRU may transmit on a UL CC.

For LTE, the UL physical channels may include, for example, a physical UL control channel (PUCCH) and a physical UL shared channel (PUSCH). On the PUSCH, the WTRU may transmit user and/or control data. On the PUCCH, and in some cases on the PUSCH, the WTRU may transmit UL control information (such as CQI/PMI/RI or SR) and/or HARQ ACK/NACK feedback. On a UL CC, the WTRU may also be allocated dedicated resources for transmission of sounding and reference signals (SRS).

In an LTE system, the network (NW) may control physical radio resources using a physical downlink control channel (PDCCH). Control messages may be transmitted using specific formats (e.g., DCI formats). The WTRU may determine whether or not it needs to act on control signaling in a given sub-frame by monitoring the PDCCH for specific data control information messages (DCI formats) scrambled using a known radio network temporary identifier (RNTI) in specific locations, or search spaces, using different combinations of physical resources (e.g., control channel elements (CCEs)) based on aggregation levels (ALs), each corresponding to either 1, 2, 4, or 8 CCEs. A CCE may include 36 QPSK symbols or 72 channel coded bits.

The PDCCH is conceptually separated into two distinct regions. The set of CCE locations in which a WTRU may find DCIs to act on is referred to as a search space (SS). The SS is conceptually split into a common SS (CSS) and a WTRU-specific SS (UESS). The CSS may be common to all WTRUs monitoring a given PDCCH, while the UESS may differ from one WTRU to another. Both SSs may overlap for a given WTRU in a given sub-frame as this is a function of the randomization function, and this overlap may differ from one sub-frame to another.

The set of CCE locations that makes up the CSS, and its starting point, is a function of the cell identity and the sub-frame number. For LTE R8/9, DCIs may only be sent with 4 CCEs (AL4) or 8 CCEs (AL8) in the CSS. For a sub-frame for which the WTRU monitors the PDCCH, the WTRU may attempt to decode 2 DCI format sizes (e.g., formats 1A and 1C and also format 3A used for power control) in up to 4 different sets of 4 CCES for AL4 (i.e., 8 blind decoding) and up to 2 different sets of 8 CCEs for AL8 (i.e., 4 blind decoding) for a total of at most 12 blind decoding attempts in the CSS. The CSS may correspond to CCEs 0-15, implying four decoding candidates for AL4 (i.e., CCEs 0-3, 4-7, 8-11, 12-15) and two decoding candidates for AL8 (i.e., CCEs 0-7, 8-15).

The set of CCE locations that makes up the WTRU SS, and its starting point, is a function of the WTRU identity and the sub-frame number. For LTE R8+, DCIs may be sent with AL1, AL2, AL4 or AL8 in the WTRU SS. For a sub-frame for which the WTRU monitors the PDCCH, the WTRU may attempt to decode 2 DCI formats in up to 6 different CCEs for AL1 (i.e., 12 blind decoding), up to 6 different sets of 2 CCEs for AL2 (i.e., 12 blind decoding), up to 2 different sets of 8 CCEs for AL8 (i.e., 4 blind decoding) and up to 2 different sets of 8 CCEs for AL8 (i.e., 4 blind decoding) for a total of at most 32 blind decoding attempts in the WTRU SS.

Which DCI formats the WTRU decodes depends on the configured transmission mode (e.g., whether or not spatial multiplexing is used). There are a number of different DCI formats (e.g., format 0 (UL grant), format 1 (non-MIMO), format 2 (DL MIMO) and format 3 (power control). The detailed format of the control messages are defined in 3GPP TS 36.212. The version of each DCI format the WTRU may decode is governed at least in part by the configured transmission mode (e.g., modes 1-7 for Release 8 and Release 9). A summary list with typical usage is as follows: DCI format 0 (UL grant); DCI format 1 (DL assignment); DCI format 1A (compact DL assignment/PDCCH order for random access); DCI format 1B (DL assignment with precoding info); DCI format 1C (very compact DL assignment); DCI format 1D (compact DL assignment with precoding info+ power offset info); DCI format 2 (DL assignment for spatial multiplexing); DCI format 2A; DCI format 3 (TPC for PUCCH/PDSCH, two bits); and DCI format 3A (TPC for PUCCH/PDSCH, single bit). The different DCI sizes resulting from different system bandwidth configurations is provided in Table 1 below.

TABLE 1

| Bandwidth | 6 | 15 | 25 | 50 | 75 | 100 |
| --- | --- | --- | --- | --- | --- | --- |
| Format 0 | 37 | 38 | 41 | 43 | 43 | 44 |
| Format 1A | 37 | 38 | 41 | 43 | 43 | 44 |
| Format 3/3A | 37 | 38 | 41 | 43 | 43 | 44 |
| Format 1C | 24 | 26 | 28 | 29 | 30 | 31 |
| Format 1 | 35 | 39 | 43 | 47 | 49 | 55 |
| Format 1B (2 tx ant) | 38 | 41 | 43 | 44 | 45 | 46 |
| Format 1D (2 tx ant) | 38 | 41 | 43 | 44 | 45 | 46 |
| Format 2 (2 tx ant) | 47 | 50 | 55 | 59 | 61 | 67 |
| Format 2A (2 tx ant) | 44 | 47 | 52 | 57 | 58 | 64 |
| Format 1B (4 tx ant) | 41 | 43 | 44 | 46 | 47 | 49 |

TABLE 1-continued

| Bandwidth | 6 | 15 | 25 | 50 | 75 | 100 |
| --- | --- | --- | --- | --- | --- | --- |
| Format 1D (4 tx ant) | 41 | 43 | 44 | 46 | 47 | 49 |
| Format 2 (4 tx ant) | 50 | 53 | 58 | 62 | 64 | 70 |
| Format 2A (4 tx ant) | 46 | 49 | 54 | 58 | 61 | 66 |

In LTE R8+ systems, whether the control signaling received on PDCCH pertains to the UL CC or the DL CC is related to the format of the DCI decoded by the WTRU, and the DCI formats may be used to control the WTRUs' communication on the UL CC and the DL CC of the cell to which the WTRU is connected.

A WTRU may request radio resources for a UL transmission by sending a scheduling request (SR) to the eNB. The SR may be transmitted either on dedicated resources (D-SR) on the PUCCH if configured or using the random access procedure (RACH) otherwise.

SRBs are radio bearers used only for the transmission of RRC and network access server (NAS) messages. SRB0 is used for RRC messages using the common control channel (CCCH) logical channel, SRB1 is for RRC messages (with a piggybacked NAS message in an embodiment) and for NAS messages prior to establishment of SRB2 using the dedicated control channel (DCCH) logical channel, while SRB2 is for NAS messages and is configured after activation of security. Once security is activated, RRC messages on SRB1 and SRB2 are integrity protected and ciphered. DRBs are radio bearers mainly used for the transmission of user plane data (e.g., IP packets).

RRC handles the control plane signaling and the exchange of layer 3 messages between the eNB and the WTRU. E-UTRA defines two RRC states: RRC_CONNECTED and RRC_IDLE. The WTRU is in RRC_CONNECTED when an RRC connection has been established; otherwise, the WTRU is in RRC_IDLE. In the RRC_IDLE state, the WTRU at least monitors the paging channel to detect incoming calls, change of system information, and, in an embodiment, also early terrestrial warning system (ETWS)/ commercial mobile alert system (CMAS) notifications and performs neighboring cell measurements and cell (re-)selection and system information acquisition. In the RRC_CO-NNECTED state, the WTRU may transmit/receive on unicast channels and at least monitor the paging channel and/or system information block type 1 to detect incoming calls, change of system information, and, in an embodiment, ETWS/CMAS notifications. The WTRU may also be configured with one or more secondary cells in addition to the primary cell. The RRC protocol is specified in 3GPP TS 36.331 and includes a definition of states, state transitions, messages (e.g., protocol data units (PDUs)) and related procedures.

The NAS layer handles mobility-related functions between the WTRU and the core network, such as the attach procedure and the tracking area update (TAU) as well as the authentication and security functions. The NAS layer also establishes and maintains IP connectivity between the WTRU and the core network.

The NAS protocol is logically transmitted on the control plane, typically over signaling radio bearers (SRBs) between the WTRU and the core network. In the Evolved Packet System (EPS), the endpoint in the CN is the mobility management entity (MME).

Figure 2:
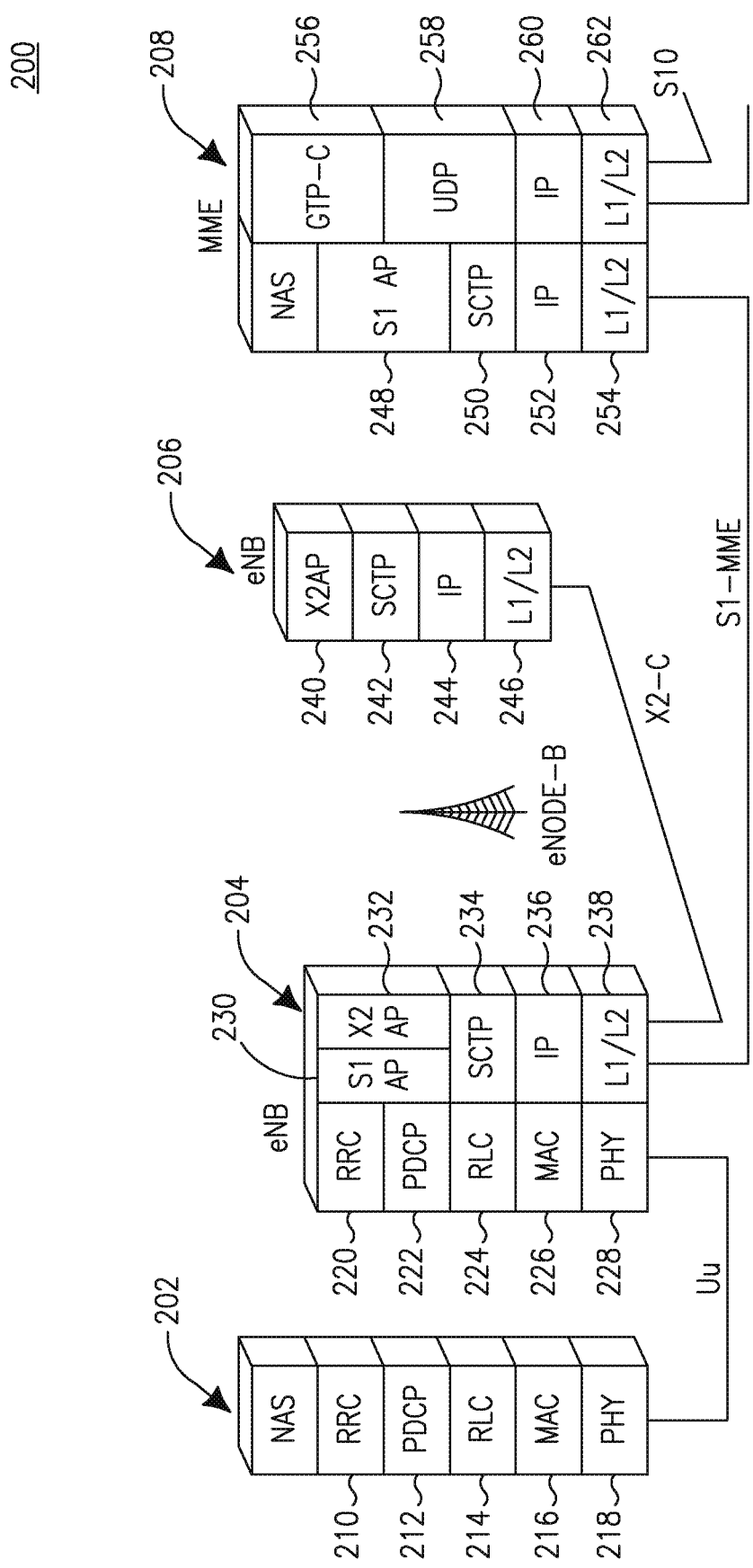
FIG. 2 is a diagram of a typical protocol stack for evolved packet system (EPS)

FIG. 2 is a diagram 200 of a typical protocol stack for EPS. The protocol stack includes a protocol stack NAS 202, eNBs 204 and 206 and an MME 208. The NAS includes an RRC layer 210, a PDCP layer 212, an RLC layer 214, a medium access control (MAC) layer 216 and physical (PHY) layer 218. The eNB 204 includes an RRC layer 220, a PDCP layer 222, an RLC layer 224, a MAC layer 226, a PHY layer 228, an S1 AP layer 230, an X2 AP layer 232, an SCTP layer 234, an IP layer 236 and an L1/L2 layer 238. The eNB 206 includes an X2 AP layer 240, an SCTP layer 242, an IP layer 244 and an L1/L2 layer 246. The MME 208 includes an NAS protocol stack, including an S1 AP layer 248, an SCTP layer 250, an IP layer 252 and an L1/L2 layer 254. The MME 208 also includes a GTP-C layer 256, a UDP layer 258, an IP layer 260 and an L1/L2 layer 262.

In the embodiments described below, the WTRU and/or the network (e.g., the eNB) may be equipped with the ability to determine at least some position-related parameters according to, for example, at least one of satellite assisted positioning, cell-based positioning, OTDOA, Wifi-based positioning, user provided positioning, satellite-based positioning, IP address-based positioning, near location-based positioning, or any other positioning method. Accordingly, positioning information for a concerned device may be available and/or may be obtained by some means.

Embodiments described herein relate to how a WTRU may initiate and establish a communication with one or more devices to access an application, the availability of which may be location-dependent. The application may be, for example, a peer-to-peer or a client-server application. This type of application may not require use of battery consuming positioning services, may provide the possibility of performing device to device communications bypassing the control network for at least the user data plane, and may enable push services based on WTRU mobility. Thus, it may be desirable to provide such services with reduced signaling, latency and WTRU power consumption compared to using the combination of a GPS device and the mobile network as the data pipe for the connection.

The range of device-to-device communications deployment may include anything from methods applicable in uncoordinated mesh networks in, for example, an unlicensed spectrum (e.g., using carrier sensing approaches) to methods applicable in network-managed communications in, for example, a licensed spectrum (e.g., a scheduler may allocate radio resources to device-to-device communications in a given geographical area). Similarly, applications that use device-to-device communications may include anything from peer-to-peer applications to client-server applications for services including, for example, social networking, marketing services and public safety applications. Examples of social networking applications may include Facebook, Linked-In, Google+ hangouts, get in touch applications such as online dating services, Latitude services, messaging and chat sessions, collaborative gaming or collaborative virtual working environments (including, for example, a virtual LAN). Examples of marketing services applications may include promotional offers (e.g., FourSquare), automated services (e.g., airport check-in), localized tourist information, contextual and/or in-store consumer information, on-demand contextual/location-based marketing and publicity, and mobile payments.

In addition to offering LTE services, for example, operators may also offer support for Wifi services (e.g., in hot spot areas) using, for example, one or more Wifi technologies such as 802.11b/g/n in the 2.4 GHz frequency band, 802.11y in the 3.6 GHz frequency band and/or 802.11a/h/j/n in the 5 GHz frequency band. Operators may deploy their Wifi services as a Wifi offload application or as Wifi aggregation.

Operators may offer services through LTE femto-cells, Home NBs (for HSPA) and/or Home eNode Bs (for LTE) as an offload application. In an embodiment, a Wifi offload may be characterized by one or more security parameters such as: the type of security protocol (e.g., one of a wired equivalent privacy (WPA), Wifi protected access (WPA) or WPA II (WPA2)); the type of encryption algorithm (e.g., one of a temporal key integrity protocol (TKIP), or a pre-share key mode (PSK)) and; the security key (e.g., a string of hexadecimal digits or a bitstring, which may, in an embodiment, correspond to information (e.g., a passphrase) from which a Wifi device further derives the encryption key using a known key derivation function). Wifi services may also be implemented using IEEE 802.16 or IEEE 802.20.

A Wifi local area network (WLAN) or Wifi may refer to any type of IEEE 802.11, 802.16 or 802.20 access. A WLAN WTRU may be a WTRU that supports and implements one or more 3GPP RAT and one or more Wifi technology. A WLAN AN may be a network node that implements Wifi access and that provides IP network connectivity. A WLAN AP may be an access point that implements Wifi access to a WLAN AN. In an embodiment, a WLAN AP may include a network node that supports and implements one or more 3GPP RAT (e.g., HSPA NB, LTE eNB) and one or more Wifi technology. Mobility with Wifi technology may be limited to pedestrian mobility, when the WLAN WTRU moves from one WLAN AP to another WLAN AP of the same WLAN AN.

A WLAN WTRU may first establish an association with a WLAN AP before exchanging data with a WLAN AN. The WLAN WTRU may first discover the available WLAN AN, then select one and perform authentication (if needed), and finally associate itself with the access point. The WLAN WTRU may be synchronized with the WLAN AN and may start sending data frames.

The IEEE 802.11 specification defines two different methods to discover available access points, namely passive scanning and active scanning. Using those methods, the WLAN WTRU may determine a list of available WLAN ANs, and user input may be required unless it is configured to automatically reconnect to a known WLAN AN.

An access point periodically broadcasts a beacon signal that may be received by a WLAN WTRU to determine a number of parameters of the corresponding WLAN AN (e.g., SSID or supported rates) as well as received signal strength. When using passive scanning, the WLAN WTRU may collect information without transmitting a request (e.g., based on signals that it can receive).

When using active scanning, the WLAN WTRU transmits a broadcast frame for which any access point in range may respond with a probe response. Active scanning is optional, and may incur additional overhead on the network for the transmission of probe signals on the shared medium.

To improve the discovery and selection of WLAN ANs, IEEE 802.11u specifies network discovery and selection methods. The WLAN WTRU may receive additional information through advertisement services prior to performing association with a WLAN AN using a transport mechanism termed GAS. GAS is a transport protocol for different advertisement protocols, and GAS transmissions may be received by WLAN WTRUs in an associated or unassociated state. The WLAN WTRU may determine that the WLAN AN supports IEEE 801.11u using the interworking element. The WLAN WTRU may post a query to a discovered SSID (e.g., using either passive or active scanning). The WLAN may then receive from a WLAN AN a response indicating operator-related parameters.

Discovery-related information may include parameters such as access network type [range 0-15] (e.g., private network, private network with guest access, chargeable public network, or free public network), roaming information, and venue information. Selection-related information may result from a query from the WLAN WTRU and may include parameters such as domain name, credential type and EAP methods.

Based on stored credentials and operator policies, and, in an embodiment, also based on user interactions, the WLAN WTRU may determine what WLAN AN to associate with. Roaming agreements between different IEEE 802.11 networks may be implemented. A protocol called SSPN supports communication to the access point, such that user credentials and user policies may be communicated to the WLAN AN.

3GPP has worked on a number of different solutions to support access to WLAN networks as means to perform interworking between WLAN access networks with the possibility to offload user traffic. For example, 3GPP TS 23.234 describes methods for a WLAN WTRU to achieve internet connectivity and access 3GPP PS services using authentication and authorization via the 3GPP system. The described methods require the establishment of a tunnel between the WLAN WTRU and the packet data gateway (PDG) in the 3GPP CN. 3GPP TS 23.234 also describes methods for a WLAN WTRU to receive IP-related configuration parameters from a 3GPP CN node, such as remote IP address, DHCP server and DNS server for the HPLMN. 3GPP TS 23.234 also describes WLAN direct IP access where the WLAN WTRU only has a local IP address (e.g., a WLAN AN identity), and WLAN 3GPP IP access where the WLAN WTRU has both a local IP address (the outer IP address of the tunnel) and a remote IP address (the inner IP address of the tunnel), which may be assigned by the WLAN AN or the PLMN within the WLAN AN IP address space.

For another example, 3GPP TS 23.402 describes architecture enhancements for non-3GPP accesses, a reference architecture for integrating WLAN as an un-trusted access to the 3GPP evolved packet core (EPC), and methods to connect WLAN to the evolved packet data gateway (ePDG) that supports PMIPv6 and GTP mobility.

For another example, 3GPP TS 23.261 describes IP flow mobility and seamless WLAN offload. For another example, 3GPP TS 23.303 describes methods to perform IP mobility between a 3GPP access and a WLAN access based on DSMIPv6.

In addition, some proprietary efforts have been discussed, such as, for example, Qualcomm's WTRU-centric connectivity engine (CnE), which discusses a framework for a 3G/LTE Wifi offload framework. The aim of the framework is to allow the routing of specific IP services (e.g., HTTP, video streaming, VoIP) over either a 3G/LTE radio interface or over a Wifi interface. The proposed framework consists of three components: a mechanism to provide operator policy, possibly dynamically, algorithms in the device to detect characteristics of unplanned Wifi networks (the focus is for the WTRU to autonomously determine what is the best possible use of the available networks) and a mechanism to allow transparent handovers between 3G/LTE and Wifi.

In particular, the Qualcomm implementation relies on the above-described standard 3GPP technology and describes WTRU-centric, WTRU-autonomous and mostly implementation-related techniques to perform measurements and WTRU-initiated handovers. In other words, the methods described rely on the establishment of a connection to the 3GPP CN and do not include methods for the network to control how the WTRU accesses the 3GPP and the WLAN AN beyond those existing for CN-based seamless IP mobility.

In general, all of the above solutions are based on establishing connectivity between the WLAN access node (WLAN AN) and the 3GPP core network (3GPP CN) and require authentication, authorization and establishment of a tunnel between the WLAN WTRU and the 3GPP CN. In other words, the principle applied is that the WLAN access is a separate and independent access technology from other 3GPP accesses (e.g., LTE, WCDMA/HSPA) and uses the facilities of the 3GPP CN to provide means for an operator to offer WLAN services including differentiated QoS and charging for the concerned data transfers. The switching of the traffic may be based on operators' policies and may be performed in the 3GPP CN. This approach may have some drawbacks in terms of deployment costs, such as deployment of a stand-alone WLAN AN and impact to existing CN nodes.

Embodiments described herein generally refer to the two following types of Wifi offload services: cellular-assisted with redirection Wifi offload and cellular-controlled Wifi offload. For cellular-assisted with redirection Wifi offload, the WLAN WTRU may establish an association with a WLAN AP following signaling received on an RRC connection established with a cellular system (e.g., a macro cell such as either an HSPA WTRU or an LTE WTRU). The signaling may be similar to an inter-RAT handover from a 3GPP access to a Wifi access. For cellular-controlled Wifi offload, the WLAN WTRU may establish an association with a WLAN AP while it maintains its RRC connection to, for example, a macro cell (e.g., either as an HSPA WTRU or an LTE WTRU). In other words, the WLAN WTRU may concurrently operate on the Wifi AN and on an HSPA or LTE radio access.

3GPP has also discussed the possibility of supporting interworking between WLAN AN and 3GPP accesses, with focus on solutions that would allow a tighter integration between the two accesses as well as avoiding the need for a duplicate 3GPP CN functionality. Discussions have included the possibility of performing some form of carrier aggregation while minimizing changes to the WLAN AN and the WLAN air interface. The envisioned deployment scenario includes small 3GPP cells (e.g., pico, femto, relays) integrated with Wifi radio or remote radio elements (RRHs) with Wifi radio.

There have also been discussions in 3GPP summarizing the different currently available CN-based alternatives as well as the above mentioned deployment scenario for consideration. The discussion focused on some form of aggregation between 3GPP LTE and Wifi, although extending the study to 3GPP HSPA should not be precluded despite the drawback of possibly requiring changes to the 3GPP RNC.

While embodiments are described herein with respect to Third Generation Partnership Project (3GPP) LTE technology, it may be equally applicable to other wireless technologies.

In embodiments described herein, client-server communications may include, for example, distributed applications that may involve a plurality of devices and which may partition tasks and resources such that a peer is either a supplier (sender) or a consumer (receiver) of the resources (e.g., application data). For example, this type of communication may involve a server that provides a service above the IP layer (e.g., an application server). For example, this type of communication may involve one or more network elements that provide services to a client such as allocation of radio resources (e.g. a femto cell network element, a base station (e.g., a Home Node B or a Home eNB), a WTRU that can provide direct WTRU to WTRU communication or an access point such as a Wifi access point).

In embodiments described herein, peering may include, for example, distributed applications that may involve a plurality of devices which may form a group and/or a peer-to-peer network. For example, this type of communication may involve one or more devices that exchange data for a given distributed IP application. For example, this type of communication may involve one or more network elements that communicate in a coordinated manner using radio resources such as a Wifi network.

From a physical layer perspective, peering may be realized, for example, using direct device-to-device transmissions, transmissions scheduled by a controlling network node using dedicated resource allocation, using a shared medium which access may be based on carrier sensing and/or involving broadcast/multicast transmissions within a coverage area. From a transport layer perspective (e.g., IP), peering may include unicast transmissions between a plurality of peers and/or multicast transmissions. For unicast transmissions, multiple copies of the same application data may be transmitted either by the originating device or by an application server towards multiple connected peers each using a different IP flow. For multicast transmissions, a single copy of the application data may be transmitted towards the network as a single IP flow, which data may be replicated by one or more network node towards each peer subscribed to the multicast flow. From an application layer perspective (e.g., a group chat application), peering may include any application that involves a plurality of devices where peers are both suppliers (senders) and consumers (receivers) of resources (e.g., application data). Thus, a peering communication may refer to any combinations of the above. For example, it may include a peer-to-peer application transported (e.g., a multiuser videoconference or a chat application) over a unicast protocol (e.g. RTP/UDP, or TCP/IP) using dedicated radio resources (e.g., PDSCH scheduled by PDCCH) over a radio link (e.g., LTE).

In embodiments described herein, a pull service may include, for example, a service by which a client would typically initiate a communication session with a server or another peer, which server/peer may await incoming requests. Further, in embodiments described herein, a push service may include, for example, a service by which a server may initiate the transfer of application data (e.g., including initiating a communication session or using an existing session) with a client or another peer, which client/peer may accept incoming application data.

In the embodiments described herein, a localized application may include any form of client-server communication or peering communication (e.g., including pull and push applications) between one or more mobile devices and zero (e.g., direct device-to-device communications) or more (e.g., for network-controlled communications over radio resources) network entities (e.g., an eNB, MME, localized application information server (LAIS)). In an embodiment, a localized application may additionally refer to a session of the application. For example, a session may be shared by a plurality of WTRUs that belong to the same group (e.g., friends, circles, community groups, or professional groups). Grouping and/or session information may be based on subscriber profile information, positioning information, or service subscription, or may be selected upon access to the LAIS (e.g., user-selected upon registration). In addition, a localized application may also refer to connectivity to a network element, such as a cell from a same or a different type of RAT (e.g., LTE, HSPA or Wifi), for example for offloading traffic from one RAT to another.

Figure 3:
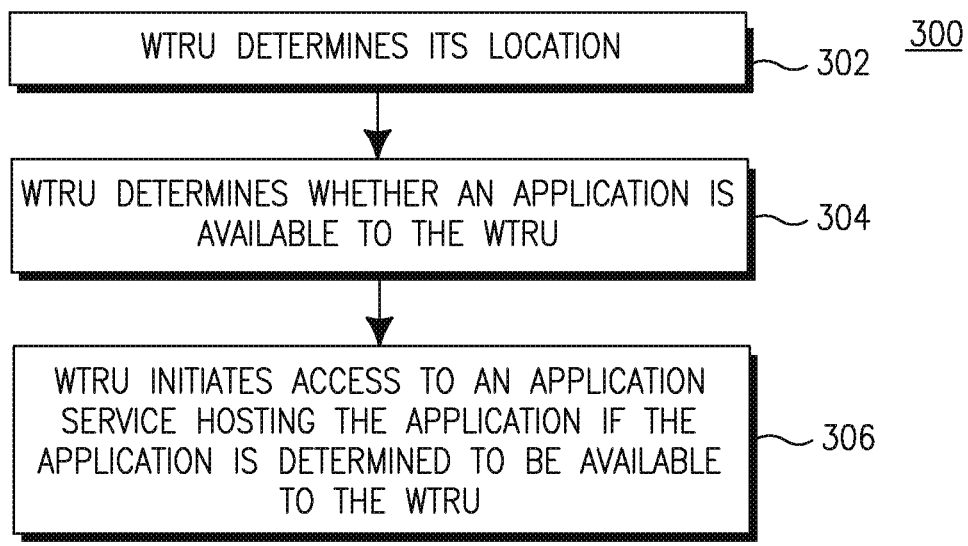
FIG. 3 is a flow diagram of a method of wireless communication.

FIG. 3 is a flow diagram 300 of a method of wireless communication. In the example illustrated in FIG. 3, a WTRU determines its location 302. The WTRU may determine whether an application is available to the WTRU, for example, based on the determined location of the WTRU (304). The WTRU may initiate access to an application service hosting the application if the application is determined to be available to the WTRU (306). In an embodiment, the WTRU may initiate access the application service by initiating registration to the application service.

Figure 4:
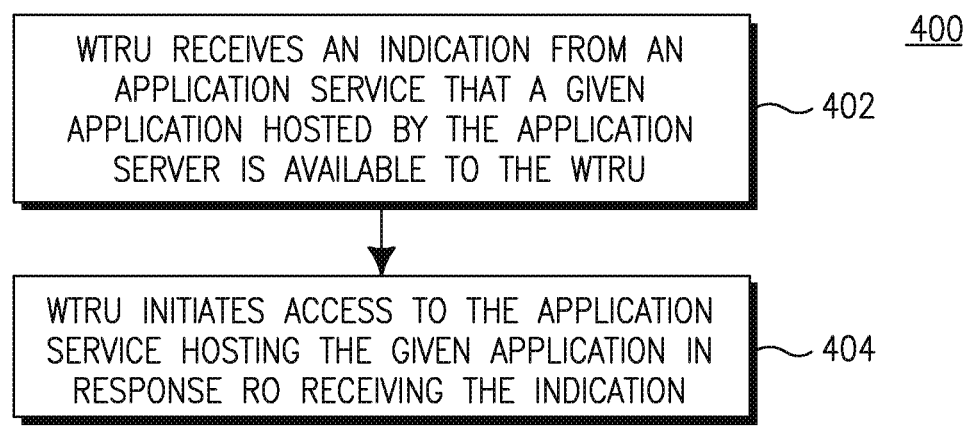
FIG. 4 is a flow diagram of another method of wireless communication.

FIG. 4 is a flow diagram 400 of another method of wireless communication. In the example illustrated in FIG. 4, a WTRU receives an indication from an application service that a given application hosted by the application service is available to the WTRU (402). In an embodiment, the indication may be an indication that the WTRU is within a location area of the given application hosted by the application service. The WTRU may initiate access to the application service hosting the given application in response to receiving the indication (404). In an embodiment, the WTRU may initiate access to the application service by initiating registration to the application service.

Whether an application is available to the WTRU (e.g., 304 or 402) may be determined based on, for example, localized applications information (LAI). LAI may be structured, for example, as a list of one or more elements, and each element in the list may correspond to information relating to a particular application. Each element in an LAI may include as least one of an application identity, an application type, a location area for a given application, a coverage area for a given application, an availability of a given application, access credentials required for a given application, communication parameters for a given application and application triggers.

An application identity may be used to identify a specific application for different transactions (e.g., registration, de-registration, or application setup). An application type may be used to determine a subset of applications for different transactions (e.g., registration).

With respect to a location area for a given application, the availability and/or accessibility of an application may be a function of a positioning criterion. On a condition that the criterion is met, an entity (e.g., a WTRU or a network node such as LAS) may determine that a WTRU may perform further procedures related to the application. For example, the WTRU may register to the concerned application (e.g., availability) and/or initiate communication for the concerned application (e.g., accessibility) when the criterion is met. For example, an application may be available within a specific geographical area. As another example, the criterion may be that the WTRU's position is within a certain area. Examples of such areas may include a geographical position with a given error margin, a sector of a cell, a cell, reception of signals from a given eNB, reception of discovery-related signals from a second WTRU, a tracking area, or a cell served by a given MME. For example, a WTRU in idle mode may perform cell (re-)selection and camp on a selected cell. The WTRU may then determine that a localized application of interest is available in the selected cell and determine that it may access the application only based on the availability of the application in the cell. The WTRU may then initiate communication for the application.

With respect to coverage area for a given application, if the coverage area is different than the location area for the given application (e.g., a coverage area is indicated and is smaller than the location area), the accessibility of an application may further be a function of a positioning criterion. On a condition that the criterion is met, an entity (e.g., a WTRU or a network node such as LAS) may determine that a WTRU may perform further procedures related to the application. For example, if the WTRU is already registered to the application or if registration is not necessary for the concerned application, the WTRU may initiate communication for the concerned application (e.g., accessibility) when the criterion is met. For example, an application may be accessible within a specific geographical area (e.g., a cell), which area may be a subset of the location area (e.g., a tracking area that includes a plurality of cells). As another example, the criterion may be that the WTRU's position is within a certain area. Examples of such areas may include a geographical position with a given error margin, a sector of a cell, a cell, reception of signals from a given eNB, reception of discovery-related signals from a second WTRU, a tracking area, or a cell served by a given MME. For example, a WTRU in idle mode may perform cell (re-)selection and camp on a selected cell. The WTRU may then determine that a localized application of interest is available in the selected cell. The WTRU may further initiate a procedure to determine/obtain its location (e.g., using a positioning method) and further determine that it may access the application based on the WTRU's position being within the coverage area of the concerned application (expressed as a geographical area in an embodiment). The WTRU may then initiate communication for the application. The coverage area for an application may be equal to its location area.

With respect to availability of a given application, the availability of a given application may be a function of whether or not at least one peer and/or server may communicate. For example, for client-server applications, a service may be available if a server is registered and/or may receive new requests from clients. For another example, for peering applications, the application may be available if the number of devices interested in (and/or registered for) the service, excluding the WTRU, is greater than a specific threshold for the service (e.g., greater than zero). For another example, for network offloading applications, the application may be available if the access credentials of the WTRU indicate that the offload cell and/or network may be accessed by the WTRU. For example, for a Wifi offload application, this may be based on subscriber type and/or an identity of the Wifi network (e.g., basic SSID and/or a MAC identity) and/or one or more security parameters. For a Home eNB or similar node, this may be based a closed subscriber group (CSG) identification (CGI), a physical cell identification (PCI) and/or a CSG list.

With respect to access credentials required for a given application, the application may require a transaction to determine whether or not a WTRU that initiates communication with a service has sufficient credentials. For example, this may include a subscriber's identification, one or more security keys for authentication and/or encryption, one or more security algorithms for authentication and/or encryption, and group identification.

Communication parameters for a given application may include at least one of IP addresses for the application, transport protocol type for a given application, port numbers for a given application, SIP/URL, MBMS-related information or security-related parameters (e.g., application-level encryption parameters). For client-server applications, for example, IP addresses for the application may include the IP address of a server (e.g., corresponding to another mobile device). For peering applications, for example, IP addresses for the application may include the IP address of a peering application server, the IP address of one or more other peers (e.g., corresponding to other WTRUs) or a multicast IP address.

A transport protocol type for a given application may be, for example, TCP (e.g., for client-server type of applications) or UDP (e.g., for peering applications). Port numbers for a given application may include, for example, a TCP port number (e.g., for client-server type of communication) or a UDP port number (e.g., for peering applications).

Any of the IP addresses for the application, transport protocol type for a given application, and port numbers for a given application may be included in an SIP message and/or a URL.

For an application that may be transmitted using MBMS channels, MBMS-related information may include parameters that may allow the WTRU to determine, for example, what MBSFN area (e.g., the MBMS cell group identity) and/or what MBMS control channel (MCCH) may be used to access the DL broadcast for a given application. In an embodiment, this may also include an identity of the MBMS service that corresponds to the concerned application.

With respect to application triggers, application triggers may include one or more condition that, when true, may trigger the WTRU to register to an application and/or a session, for example, to access an application and/or a session or to terminate its registration to an application. For example, this may include positioning information for proximity detection such that a WTRU may autonomously register and/or initiate access to the application when detecting that it is within a certain distance of the indicated position.

A WTRU may receive, transmit and/or store LAI. In an embodiment, a WTRU may obtain LAI from another WTRU. In another embodiment, a WTRU may obtain LAI from a network entity (e.g., an LAI server (LAIS)). Other entities may access at least part of the LAI. For example, a network entity may store and exchange the above information with a WTRU.

To determine whether a WTRU is in an area that supports localized applications (e.g., whether a serving cell supports localized applications), the WTRU may maintain one or more parameters related to support of localized applications within a given cell. Examples of such parameters may include indication of support for localized applications, scheduling information, and LAI for one or more applications available in the concerned cell. Alternatively, the WTRU may receive signaling that includes at least some of the above parameters via at least one of broadcasted information, dedicated signaling and higher layer signaling.

An indication of support for localized applications may include, for example, an indicator bit and/or the presence of an information element in received signaling that provides, for example, further cell-specific parameters used to access localized applications in the concerned cell. For example, a WTRU may detect the presence of a system information block (SIB) for localized applications in the broadcast system information for the cell and determine that localized applications are supported for the concerned cell. In an embodiment, this may include an indication of whether or not registration of services and/or initiation of services not currently available for the concerned cell is supported (e.g., the list of advertised applications may be semi-static and read only for WTRUs).

Scheduling information may include, for example, a specific RNTI (e.g., an LA-RNTI) for scheduling further cell-specific parameters used to access localized applications in the concerned cell. In an embodiment, a set of one or more subframes and/or transmission timing may be used for the scheduling of the further cell-specific parameters. For example, the WTRU may receive, on an SIB applicable to localized applications, an RNTI that the WTRU may use to decode further parameters (e.g., a list of applications available in the concerned cell and applicable parameters, if any) scheduled on, for example, the PDSCH.

LAI for one or more applications available in the concerned cell may include a list of available services and/or service types (e.g., service advertisement). This may include, for example, a list of one or more applications available in the concerned cell and applicable parameters. For example, the WTRU may receive this information on an SIB applicable to localized applications or on a separate transmission (either broadcast or dedicated) on the PDSCH. The WTRU may use the LAI to determine whether or not it may access one or more localized applications in a given serving cell based on, for example, location area and/or coverage area for the concerned application. This may be the case, for example, in a deployment where an eNB handles localized applications in a transparent manner from the perspective of handling of radio resources of a given cell.

With respect to embodiments where the WTRU receives signaling that contains at least some of the above parameters via broadcast information, the WTRU may receive parameters related to localized application on a PDSCH transmission scheduled using a DCI received in the CSS of the PDCCH of the concerned cell and scrambled by an RNTI (e.g., on an SIB scheduled using SI-RNTI or separately using a cell-specific RNTI (e.g., LA-RNTI)). In an embodiment, at least some parameters related to localized applications may be received on an MBMS transmission.

For example, a WTRU in idle or connected mode may receive one or more parameters related to localized information in an SIB on the broadcast system information as part of the system information acquisition (in case of mobility when moving to the concerned cell) or as part of its update procedure for system information. The WTRU may detect an indication that localized applications are supported in the concerned cell (e.g., from reception of an SIB such as SIB2) and determine that localized applications are supported in the concerned cell. The WTRU may initiate a connection to the network to obtain further parameters for localized applications using, for example, dedicated signaling. Alternatively, the WTRU may detect the presence of an SIB specific for localized applications and determine that localized applications are supported in the concerned cell.

In an embodiment, the SIB may include scheduling information (e.g., LA-RNTI) such that the WTRU may receive further parameters on the PDSCH such as a list of available applications and parameters, if any. Alternatively, the SIB may include a list of available services and parameters, if any. In an embodiment, the WTRU may use the received information to determine whether or not to initiate a registration to the application.

With respect to embodiments where the WTRU receives signaling that contains at least some of the above parameters via dedicated signaling, the WTRU may receive parameters related to localized applications on a PDSCH transmission scheduled using a DCI received in the CSS of the PDCCH of the concerned cell and scrambled by the WTRU's C-RNTI. In an embodiment, at least some parameters related to localized applications may be received using an RRC transaction (e.g., an RRC reconfiguration procedure) and/or using a higher layer protocol (e.g., transported in an RRC PDU) for transactions between the WTRU and an LAIS. Alternatively, at least some parameters related to localized applications may be received using a MAC control element.

A WTRU may include, as part of its WTRU capability, an indication that it supports access to localized services. The WTRU may then be configured by the eNB with the necessary parameters to access the services, if supported and/or available in the serving cell. For example, a WTRU in connected mode may be configured by the network with scheduling information (e.g., LA-RNTI) such that the WTRU may receive further parameters on the PDSCH such as a list of available applications and parameters, if any. In an embodiment, this may be based on the WTRU's capability as indicated during the initial connection setup. In an embodiment, the configuration may include a list of available service and parameters, if any. In an embodiment, the WTRU may use the received information to determine whether or not to initiate a registration for an application.

With respect to embodiments where the WTRU receives signaling that contains at least some of the above parameters via higher layer signaling, a WTRU in connected mode may receive at least some of the parameters using a higher layer protocol (e.g., transported in an RRC PDU). For example, the WTRU may receive a list of applications and/or service types available for the WTRU from the LAIS server. In an embodiment, this may be part of a request-response transaction between the WTRU and the LAIS, which transaction may include the exchange of parameters related to the position and/or location of the WTRU, user profile and/or security parameters.

When the WTRU has access to parameters related to localized applications, the WTRU may additionally initiate a location and/or positioning-related procedure either when it detects that the cell supports localized applications or when it determines that it should initiate a registration procedure. In an embodiment, the WTRU may initiate such additional procedures autonomously, based on a user profile stored within the WTRU and/or upon input from a user of the concerned WTRU (e.g., for pull services). Alternatively, the WTRU may initiate such procedures when it receives a request from the network (e.g., either from the eNB or from the LAIS). For example, in such cases, the WTRU may activate a GPS module, initiate a location update and/or a traffic area update (e.g., towards the MME), initiate a positioning request/update procedure (e.g., with an LCS using, for example, an A-GPS procedure, OTDOA, cell-ID based positioning or any other positioning method), determine position-related parameters that may be used for proximity detection, initiate proximity detection for at least one application of interest.

A WTRU may determine what localized applications are available by performing a procedure to detect that it is within the location area of a localized application of interest (e.g., discovery) by, for example, autonomously determining that it is within the location area of a given application (e.g., a pull behavior), transmitting a request to a network node (e.g., a pull behavior), receiving an indication from the network that it is within the location area of a given application (e.g., a push behavior), or determining that an MBMS session (e.g., one or more MTCHs) that corresponds to the concerned application is scheduled (e.g., on MCCH) in the concerned cell. With respect to the WTRU autonomously determining that it is within the location area of a given application, the application may be advertised in the cell (e.g., listed in an SIB or other information received on a PDSCH transmission). With respect to the WTRU transmitting a request to a network node, for example, the WTRU may transmit position information to the LAIS together with a request for a list of applications available in the corresponding area. In an embodiment, the WTRU may do this only for a certain type of application. The WTRU may receive LAI for a list of applications that matches the criteria indicated in the request.

With respect to the WTRU receiving an indication from the network that it is within the location area of a given application, the WTRU may receive an indication from the network that an application is available. In an embodiment, the indication may be received from the LAIS. In an embodiment, the WTRU may receive the indication for an application to which the WTRU has previously registered. In an embodiment, the indication is a request for the WTRU to initiate communication with the application.

For example, a WTRU may register to the concerned application (e.g., availability) and/or initiate communication for the concerned application (e.g., accessibility) when a criterion is met. For example, an application may be available within a specific geographical area. As another example, the criterion may be that the WTRU's position is within a certain area. Examples of areas may include a geographical position with a given error margin, a sector of a cell, a cell, reception of signals from a given eNB, reception of discovery-related signals from a second WTRU (for example, above a given threshold in signal strength and/or according to an identity broadcast in the discovery-related signal), a tracking area, or a cell served by a given MME.

With respect to the WTRU determining that an MBMS session that corresponds to the concerned application is scheduled in the concerned cell, a WTRU that determines that a localized application of interest is available in a given area may perform an initial access to the network, register to the LAIS, perform more frequent positioning updates or perform a tracking area update (TAU).

A WTRU in idle mode may discover that an application of interest is available according to a method described above. The WTRU may then perform an initial access to the network (e.g., a transition from idle mode to connected mode), for example, to register and/or access the concerned application or to perform a procedure to determine its position. For example, the WTRU may discover an application of interest, determine that it is within the location area of the concerned application, register to the application and update its positioning information to determine whether or not the criterion regarding the coverage area of the application is met.

With respect to a WTRU registering to the LAIS, a WTRU registering to the LAIS may enable the network to manage mobility, positioning, tracking and session initiation for the concerned WTRU and for the concerned service.

With respect to a WTRU performing more frequent positioning updates, the WTRU may perform a positioning procedure at regular intervals, and/or maintain a positioning method active while it is within the location area of an application of interest. In an embodiment, the WTRU may perform a positioning procedure at regular intervals and/or maintain a positioning method active while it is within the location area of an application for which the WTRU has previously registered to with the LAIS. The update frequency may be a function of distance and speed (e.g., difference between previous position divided by time since last update) to save battery and network load, in particular, if location area is not directly overlapping (e.g., equivalent) to the coverage area for the concerned application.

With respect to a WTRU performing a TAU, for example, a WTRU in idle mode may perform cell re-selection and may camp on a different cell. The WTRU may determine that the cell supports localized applications and may determine that it is interested in a specific application, independently of whether or not the WTRU can determine if a concerned application is available in the concerned cell. The WTRU may perform the TAU procedure. Subsequently, the WTRU may receive paging. In particular, the network may determine, based on the WTRU's location, whether or not the WTRU should initiate communication to a given application (e.g., a registered application), for example, in case of push services.

Whether or not an application is available and/or is accessible may be determined as a function of at least one of the position of the WTRU, the location area of the application (e.g., as indicated by LAI), the coverage area of the application (e.g., as indicated by LAI), reception of discovery-related signals from a second WTRU that is a server or peer for the concerned application (for example, above a given threshold in signal strength and/or according to an identity broadcast in the discovery-related signal) whether or not the WTRU is registered for the concerned application, whether or not the WTRU's position meets the criterion for location area and/or for coverage area for the concerned application, the WTRU capabilities, the subscriber information and/or profile for the WTRU, the user's credentials (e.g., for the LAIS and/or for the concerned application) and/or group membership. This may be determined either by the WTRU (e.g., for pull behavior) or by the LAIS (e.g., for push behavior).

For example, whether or not an application is available for a given WTRU may be a function of the WTRU's position and the application's location area, in which case the WTRU may register to the LAIS for the concerned application. For example, whether or not a WTRU may connect to a session of an application may be a function of the WTRU's position, the WTRU's group membership/credentials and the application's coverage area for the corresponding session, in which case the WTRU may establish a connection to the session of the concerned application. In another example, the previous examples and related steps may be combined for an application for which the location area and the coverage area directly overlaps, and, in an embodiment, for which proximity detection is detected (e.g., based on the WTRU's mobility to a cell within the location area of the concerned application).

A WTRU may detect that it is within the proximity of (or that it has entered) an area where it may access a localized application. This area may correspond to the location area of the concerned application or to the coverage area within the location area of the application, if specified. The coverage area may be identical to the location area for a given application.

For example, a WTRU may determine that an application is available, that it is within the location area of the application, and register to the application. When it determines that it is within the coverage area of the concerned application, it may initiate communication with the application. Once it leaves the coverage area, it may stop communication with the application. In an embodiment, the WTRU may remain registered to the application. In an embodiment, the WTRU may maintain its registration until it leaves the location area of the application.

In an embodiment, the proximity detection may be performed by the network. The IE may receive a network-initiated transmission for the concerned application when it determines that the WTRU is within the coverage area of the application (e.g., push behavior). This may be based on a network-controlled positioning method.

The application service hosting the application may be any one of a number of different entities including, for example, another WTRU or a network entity such as an LAI server (LAIS). An LAIS may be used to enable connectivity between devices (e.g., peers, servers or clients), between network nodes and/or between combinations thereof for a given localized application. The LAIS may be external to the WTRU. The LAIS may be either a stand-alone entity, co-located with another entity or integrated into another entity. The LAIS may be located in the network (e.g., in the EPS) or in another mobile device. In one example, the LAIS may be co-located with an MME. In another example, the LAIS may be co-located or integrated with a LCS server. In another example, the LAIS may be co-located or integrated with an eNB. In another example, the LAIS may be co-located with an application server or in a peer (e.g., in any device connected to the network).

A WTRU may communicate with the LAIS by, for example, requesting LAI, receiving LAI, transmitting LAI for a given application, registering to an application, de-registering from an application, exchanging a user profile, network-initiated application setup, or WTRU-initiated application setup.

A WTRU may request LAI for one or more applications and/or application types from the LAIS. For example, a WTRU may initiate transmission of a request by determining that the cell supports localized applications, performing a procedure to determine its position and/or communication with an LCS or being notified by the network (e.g., being notified of the availability of LAIS).

A WTRU may also receive LAI from the LAIS. In an embodiment, a network node may initiate the transmission of LAI to a WTRU, for example, to a WTRU that has previously registered to the application (or for information regarding a type of application). For example, the network node may determine that the WTRU is within the location and/or coverage area of the concerned application. In an embodiment, this may be following a procedure by the WTRU to determine the WTRU's position. As another example, the network node may transmit LAI upon registration by the WTRU (e.g., to the core network such as an NAS ATTACH procedure). As another example, the network may transmit LAI to the WTRU following a traffic area update procedure for the WTRU. As another example, the network node may transmit LAI based on the WTRU's capabilities.

A WTRU may transmit LAI pertaining to an application initiated by the WTRU (e.g., a peer-to-peer application) or to a service offered by the WTRU to the LAIS.

A WTRU may register to an application, for example, as a client, as a server or as a peer for a given application and/or session. In an embodiment, a registration may have a validity period and may require periodic updating.

A WTRU may de-register from an application, for example, as a client, as a server or as a peer for a given application and/or session. For example, the WTRU may transmit an explicit request to the LAIS to de-register from an application. Alternatively, the LAIS may indicate to the WTRU that it is no longer registered for a given application. Alternatively, a registration may expire or may no longer be valid, for example, following a specific event (e.g., a mobility event such as a change of cell, MME, Tracking Area outside of the location area and/or the coverage area of the concerned application, or the position criteria for the application being no longer met).

The WTRU may transmit user-related information such as a profile including application identity of interest or application type of interest, for example, for push services.

The WTRU may receive a request from the LAIS to establish a session, for example, with another WTRU, for a given application and/or session. The WTRU may respond with an acknowledgement for the request, for example, only for an application and/or session for which the WTRU has previously registered with the LAIS. Alternatively, the WTRU may initiate a registration for the given application in response to the request.

The WTRU may transmit a request to the LAIS to establish a session, for example, with another WTRU, for a given application and/or session. Here, the WTRU may receive a response from the LAIS that includes LAI for the specific application and/or session, for example, only for an application for which the WTRU has detected proximity and/or only for an application and/or session for which the WTRU has previously registered with the LAIS.

The WTRU and the LAIS may, for example, communicate using a request-response type of protocol. Transactions between a WTRU and an LAIS may be transported as higher-layer data within the RRC protocol, where the eNB may forward the transaction to the proper LAS. Alternatively, a WTRU configured with necessary IP parameters to communicate with the LAIS may transmit data over a data radio bearer (DRB) in a manner transparent to the RAN.

In an embodiment, the LAIS may store and maintain subscriber profile information for a given WTRU. For example, the LAIS may store profile information temporarily, for example, while the WTRU is registered to at least one localized application of the LAIS.

In an embodiment, the LAIS may initiate a connection to a mobile device registered (e.g., interested) to a localized application (e.g., a service or a peering application), for example, for push applications and if the LAIS determines that the positioning information applicable to the WTRU matches the location area and/or coverage area of the concerned application.

To communicate with the LAIS, the WTRU may be provided with the necessary communication parameters (e.g., IP address), for example, if communication between the LAIS and the WTRU is transparent to the eNB. For example, the WTRU may receive such parameters in an NAS message when, for example, it performs the ATTACH procedure, or in an RRC message when the WTRU is configured. Alternatively, the eNB may direct the transactions between the WTRU and the LAIS to the LAIS configured for the corresponding eNB, for example, if RRC is used as the transport protocol.

To communicate with a given application session, the WTRU may receive LAI including communication parameters for the concerned session. The WTRU may receive the LAI, for example, upon request for LAI to the LAIS, upon registration to the LAIS or upon an application setup either requested by the WTRU or by the network.

A WTRU in connected mode may register that it is interested in receiving and/or transmitting information for a localized application by registering to the LAIS, registering to a localized application and/or session, registering as a server, registering as a client, or registering as a peer.

For a WTRU registering to the LAIS, for example, the WTRU may perform a transaction with the LAIS such that the WTRU registers to the LAIS. Such a transaction may include, for example, establishment of security and access credentials between the WTRU and the LAIS as well as exchange of the list of localized applications available to the WTRU and associated parameters, if any. Once registration is confirmed, the WTRU may perform further registrations and/or monitor cell broadcast for applications available in the concerned cell.

For a WTRU registering to a localized application and/or session, for example, the WTRU may perform a transaction with the LAIS such that the WTRU registers to a localized application/session of interest. The WTRU may then perform proximity detection or detection of discovery-related signals from a second WTRU. Alternatively, the WTRU may register to an ongoing session for a given application. Once registration is confirmed, the WTRU may then immediately join the session and initiate reception and/or transmission for the application. Such transaction may include establishment of security and access credentials between the WTRU and the LAIS for the concerned application and/or session.

For a WTRU registering as a server, for example, the WTRU may perform a transaction with the LAIS such that the WTRU registers itself as a server for a localized application. Such transaction may include, for example, establishment of security and access credentials between the WTRU and the LAIS for the concerned application as well as exchange of communication parameters for the concerned service. Once registration is confirmed, the WTRU may then wait for reception of incoming requests from other clients.

For a WTRU registering as a client, for example, the WTRU may perform a transaction with the LAIS such that the WTRU registers itself as a client for a localized application. Such transaction may include establishment of security and access credentials between the WTRU and the LAIS for the concerned application as well as exchange of communication parameters for the concerned service. Once registration is confirmed, the WTRU may then initiate requests to the server of the application.

For a WTRU registering as a peer, for example, the WTRU may perform a transaction with the LAIS such that the WTRU registers itself as a peer for a localized application. Such transaction may include establishment of security and access credentials between the WTRU and the LAIS for the concerned application and/or session as well as exchange of communication parameters for the concerned service. Once registration is confirmed, the WTRU may then initiate transmission/reception of application traffic.

Each of the transactions described above may include exchange of user profile information and exchange of positioning information. User profile information may further include session specific information and/or access credentials (e.g., a session identity, a group identity, or application subscription information).

In an embodiment, the WTRU may unregister any of the above registrations when the registration is no longer needed. In an embodiment, any of the above registrations may expire (e.g., time out), for example, when the WTRU may no longer communicate with the LAIS or when the WTRU does not update the concerned registration.

The network may establish communication between a plurality of WTRUs and a localized application such that the RAN may forward application data within the same eNB (e.g., if all concerned WTRUs are connected to cells of the same eNB) or from one eNB to another, for example, over X2 otherwise.

In an embodiment, a WTRU may be configured by the eNB with specific radio resources for a given application such that WTRUs may communicate, for example, directly with each other. Alternatively, the WTRU may receive control signaling for dynamic or semi-static scheduling of resources for a given application.

The WTRU may differentiate data for a localized application using at least one of the following. The WTRU may be configured to use a specific IP destination address (and, in an embodiment, a specific port number) for the given application (e.g., a multicast address and/or the IP address of a MBMS server with a port number for the concerned application/session). In an embodiment, whether or not the MBMS server is used may be a function of the number of WTRUs registered to the concerned application. The WTRU may be configured with a specific logical channel (LCH) and/or DRB identity for the given application. The WTRU may be configured with a specific logical channel group (LCG) for the given application.

This may permit differentiation of data between localized applications and other types of applications. In an embodiment, data for localized applications may be transmitted using radio resources specifically indicated for localized applications (e.g., by L1 signaling such as using a specific DCI, a specific RNTI, or a flag indication in the DCI format). In an embodiment, DL data may be received by multiple WTRUs using the same RNTI, for example, an application-specific and/or cell-specific RNTI. The WTRU may be configured to receive DL data for the concerned application on a MBMS channel.

In addition to managing LAI, the LAIS may also manage registration status to a given localized application, such as service registration state, client registration, peering registration and application triggers. With respect to service registration state, for example, the LAIS may manage a list of services, which may be registered by WTRUs. In an embodiment, the list of services may be a list of WTRUs that are communicating with the registered server, applicable group membership and credentials. With respect to client registration (e.g., interest for a given service), the LAIS may manage a list of WTRUs that have registered for the service, such as a list of WTRUs that are communicating with the registered server, applicable group membership and credentials. With respect to peering registration, the LAIS may manage a list of WTRUs that have registered for the application, such as a list of WTRUs that are communicating with the application, applicable group membership and credentials. With respect to application triggers, the LAIS may manage a list of criteria for each application, by which the LAIS may initiate a procedure for a WTRU to communicate with the application (e.g., push behavior), for example, based on group membership and/or a user's profile.

In an embodiment, the LAIS may interact with other network nodes (e.g., with an eNB, an MME, an LCS and/or an MBMS server). In an embodiment, any of the above information may be exchanged between concerned nodes. Additional interactions may also be possible between the LAIS and other network nodes (e.g., with an eNB, an MME, an LCS and/or an MBMS server).

With respect to interactions between the LAIS and an MME to trigger a push application, the LAIS may receive an indication that a WTRU has a new position and/or the position (or updates thereto) of the WTRU from an MME, either from an update procedure (e.g., following a TAU or due to connected mode mobility) between the MME and the WTRU or from a request from the LAIS to the MME. In an embodiment, the LAIS may receive subscriber profile information from the MME application to the concerned WTRU. In an embodiment, the LAIS may indicate to the MME that a given WTRU may be paged, either to initiate communication, for performing a TAU procedure and/or to determine a WTRU's location. For example, the LAIS may perform such actions for push services based on a WTRU's position.

With respect to interactions between an LAIS and an LCS to trigger a push application, the LAIS may, for example, receive an indication that a WTRU has a new position and/or the position (or updates thereto) of a WTRU from an LCS, either from an update procedure (e.g., following a positioning procedure) between the WTRU and the LCS or from a request from the LAIS for the concerned WTRU.

With respect to interactions between an LAIS and an MBMS server to exchange information and/or register an MBMS service, the LAIS may register an MBMS service to the MBMS server for a localized application. The LAIS may receive information necessary to access an MBMS service corresponding to a localized application (e.g., what MBSFN area (e.g., the MBMS cell group identity) and/or what MBMS control channel (MCCH) may be used to access the DL broadcast for a given application). This may also include an identity of the MBMS service that corresponds to the concerned application.

With respect to interactions between an LAIS and an eNB to provide information for cell broadcast, for example, the LAIS may provide information that an eNB may transmit to one (e.g., using dedicated signaling) or more WTRUs (e.g., using system information broadcast and/or a common channel for localized application) based on at least one of availability of one or more localized applications (e.g., whether or not a cell supports localized applications) or information related to localized applications. Information about availability of one or more localized applications, for example, may be used by a WTRU to determine whether or not a cell supports localized services. Information related to localized applications may include, for example, a list of one or more localized applications available for the concerned cell, if any, or, for a given application, additional information related to a localized application. For example, this information may be used by a WTRU for registration, for discovery and/or for proximity detection of a localized application.

Examples of localized applications may include client-server applications, peer-to-peer applications, direct WTRU to WTRU communications (with or without assistance from the cellular infrastructure to manage the allocation of radio resources) and Wifi offload applications.

With respect to client-server applications, for example, an un-registered server may first determine that localized services are available in an area and may then register the service. The network may start advertising the service on behalf of the server such that a client may determine that at least one service of interest is available in the area. The WTRU may then start a procedure to wait for or detect a proximity indication (it may be the same as a discovery procedure within a cell or based on reception of discovery-related signals from a second WTRU, or something based on positioning within a cell depending on the granularity). Once at proximity, the client may access the localized service.

Different types of client-server applications may include, for example, pull services and push services. An example of a pull service may include a marketing application. For example, a user may enter a store, request a list of product types according to some criteria, request further information and then locate and pay for the products. Another example of a pull service may include a personal youtube event. For example, a user may enter a location for an event, request a list of available streams related to the event and select a specific stream (e.g., buy or download an album at a discount). An example of a push service may include a marketing application. For example, a user may enter a store, receive targeted offers based on profile, interest, shopping list and/or actual position and locate and pay for the offered product/service. Another example of a push service may include a personal youtube event. For example, a user may enter a location and an event, receive streaming from members of the group and/or group chat, or group voice sessions.

With respect to peer-to-peer applications, for example, an un-registered peering application may first determine whether localized services are available in an area and may then register the availability/interest of the device to the LAIS for at least one peer-to-peer application. The WTRU may then start a procedure to wait for or detect a proximity indication (it may be the same as a discovery procedure within a cell or based on reception of discovery-related signals from a second WTRU, or something based on positioning within a cell depending on the granularity).

Different types of peer-to-peer applications may include, for example, pull services and push services. For a pull service, the user may initiate the registration to the LAIS. For a push service, the LAIS may initiate the setup of the peering application based on a stored user profile and interest.

For either of client-server or peer-to-peer applications, the setup may be that once connected to the network, the WTRU may receive user plane data for the localized application using network-allocated dedicated resources for both UL and DL transfers (applicable to both direct device-to-device communications or through the radio access network). Alternatively, the WTRU may be configured for MBMS reception for the DL user plane for the localized application.

With respect to direct communication between two or more WTRUs (with or without assistance from the cellular infrastructure to manage the allocation of radio resources), a wireless system may use the localized application principles and framework described above to realize management of connectivity for the purpose of offloading user data from the cellular network.

With respect to Wifi offload applications, a cellular system may use the localized application principles and framework described above to realize management of connectivity for the purpose of offloading user data from the cellular network. Such embodiments may be equally applicable to the Home eNB, Home NB and other types of small cell and pico-cell deployments.

Figure 5:
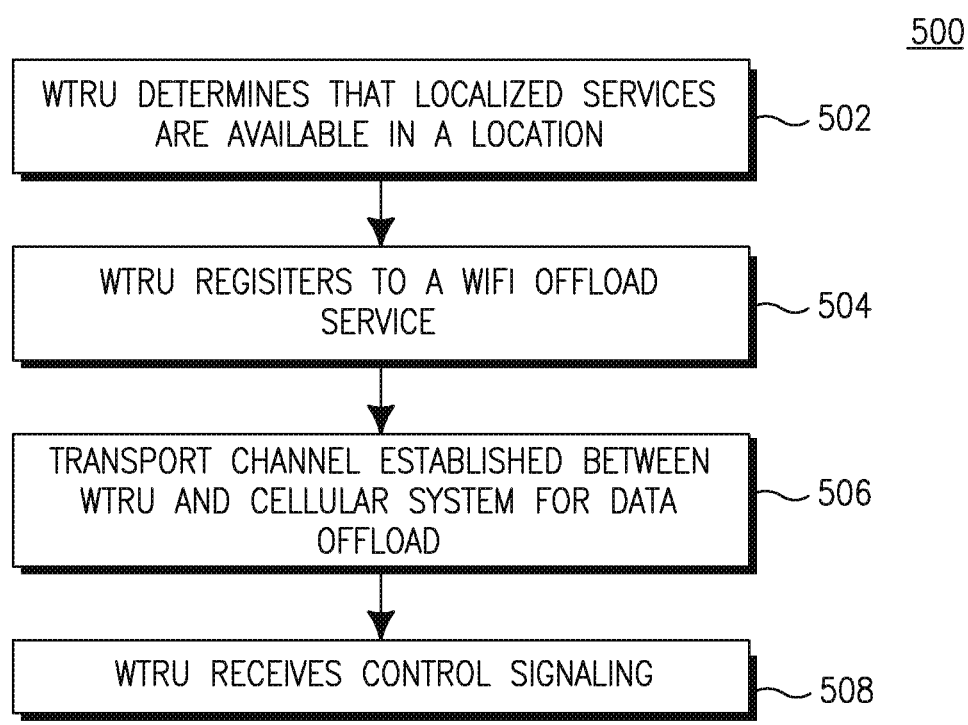
FIG. 5 is a flow diagram of an example method of Wifi offload using localized applications.

FIG. 5 is a flow diagram of an example method of Wifi offload using localized applications. A WTRU (e.g., a WLAN AP) may determine that localized services are available in a location (502) and register to a Wifi offload service (e.g., an LAIS) (504). In an embodiment, the WTRU may register itself to the Wifi offload service using a fixed IP interface and may also implement a cellular technology and register to the Wifi offload service using an established RRC connection. A transport channel may be established between the WTRU and the cellular network for data offload (506). In an embodiment, the Wifi offload service (e.g., the LAIS) may initiate a connection to the WTRU to establish the connection. The WTRU may receive control signaling (508). The WTRU may receive the control signaling from the cellular network for an offload operation. In an embodiment, the cellular network may trigger Wifi offload for a given WTRU based on a detection that the SLAN WTRU is within proximity of a Wifi offload service provided by a WLAN AN.

For example, a WLAN AP may support methods to provide Wifi offload services. The WLAN AP may first determine that localized services are available in an area. The WLAN AP may then register itself to the Wifi offload service (if available). For example, the WLAN AP may register to the LAIS using a fixed IP network interface. The WLAN AP may additionally implement a cellular technology (e.g., HSPA or LTE) and register to the LAIS using the corresponding wireless IP network interface. For example, if the network implements LAIS in the RAN (e.g., in or above the RRC layer), the WLAN AP may simply issue an RRC request to register itself to the LAIS using an established RRC connection. As another example, if the network implements LAIS in the core network (e.g., in or above NAS), the WLAN AP may simply issue an NAS request to register itself to the LAIS using an established RRC connection.

In this case, in an embodiment, the WLAN AP may use 3GPP-based subscription credentials when it registers itself for the Wifi offload service to the network for security and/or authentication purposes. The registration for the offload service may include parameters including at least one of WLAN AN identity-related information (e.g. parameters required for 802.11 WLAN AN identification), security-related information (e.g. parameters required for 802.11 authentication), access-related information (e.g. parameters required for 802.11 association), discovery-related information (e.g. parameters required for 802.11u functionality), selection-related information (e.g. parameters required for 802.11u functionality), location-related information (e.g. parameters required for localized application functionality), and type and parameters of the offload service (e.g. parameter required to the functionality of the cellular system).

WLAN AN identity-related information may include at least one of an identity of the Wifi network (e.g., Basic SSID and/or a MAC identity), access credentials (e.g., subscriber-based parameters) or operating channel/frequency. As another example, in case of offload to a Home eNB or similar, instead of offloading to a Wifi network, this may be based a closed subscriber group (CSG) identification (CGI), a physical cell identification (PCI) and/or a CSG list.

Security-related information may include at least one of the type of security protocol, the type of encryption algorithm, or the security key. The type of security protocol may be, for example, one of a wired equivalent privacy (WPA), Wifi Protected Access (WPA) or WPA II (WPA2). The type of encryption algorithm may be, for example, one of a temporal key integrity protocol (TKIP), or a pre-share key mode (PSK). The security key may be, for example, a string of hexadecimal digits, or a bitstring. In an embodiment, it may correspond to information (e.g., a passphrase) from which a Wifi device further derives the encryption key using a known key derivation function.

Access-related information may include supported access data rates or other similar information. Discovery related information may include at least one of access network type, roaming information and venue information. Selection-related information may include at least one of domain name, credential type or EAP methods.

Location-related information may include at least one of a location area for the offload service and coverage area for the offload service. The location area for the offload service may correspond to the location of a plurality of WLAN APs that belong to the same WLAN AN and that may provide continuous pedestrian coverage. The coverage area for the offload service may correspond to the coverage area of a plurality of WLAN APs that belong to the same WLAN AN and that may provide continuous pedestrian coverage.

Type and parameters of the offload service may include at least one of whether the WLAN AN (or WLAN AP) supports cellular-assisted with redirection offload, cellular-controlled offload service or both and parameters for the offload service in case of cellular-controlled offload service. For example, this may include connectivity information for the cellular system (e.g., either the RAN or the CN) necessary to establish an interface for the transfer of user data over the wired interface of the WLAN AP (e.g., from a RAN perspective, similar to an X2 interface or from a CN perspective, similar to an IP tunnel).

A WLAN AP may register itself to the LAIS as a server that can provide Wifi offload services. For example, on a condition that the WLAN AP supports an offload service, the WLAN AP may register to the LAIS with WLAN AN identity-related information (e.g., SSID), security-related information for Wifi shared authentication, or access-related information (e.g., supported data rates). The registration may also include, in an embodiment, discovery-related information and/or selection-related information, for example, if WLAN APs belonging to a different network operator than the cellular operator are allowed to register to the LAIS as offload servers. Otherwise, this information may be based on other credentials of the WLAN AP, such as USIM-related credentials, and/or if roaming between offload servers belonging to different network operators is possible.

The LAIS may then store the information received during the registration process. For a WLAN AN (or WLAN AP) supporting a cellular-controlled offload service, the LAIS may initiate a connection to the WLAN AN (or WLAN AP) to establish a transport channel between the cellular system and the WLAN AN/AP. In an embodiment, this connection may be established only when a first WLAN WTRU is configured (either via an inter-RAT handover to the Wifi offload network or via a reconfiguration that indicates the WLAN AN offload) for offload operation.

A WLAN WTRU may register itself to the LAIS as a client interested in Wifi offload services. For example, for a WTRU that supports Wifi and also supports an offload service, the WLAN WTRU may register to the LAIS. In an embodiment, the WLAN WTRU may include capability-related parameters in the registration (e.g., supported data rates, supported security protocols and encryption methods) and other capabilities related to Wifi operation necessary to access a WLAN AN.

The WLAN WTRU may also provide location information (e.g., upon request from the cellular system) according to any of the methods described herein. For example, the network may trigger the Wifi offload for a given WTRU based on detection that the WLAN WTRU is within proximity and/or within the coverage area of a Wifi offload service provided by a WLAN AN. In an embodiment, this may additionally be triggered in combination with indications of congestion in the cellular system and/or insufficient resources in the cellular system to serve data traffic for the given WTRU.

The WLAN WTRU may subsequently receive control signaling from the cellular network (either via an inter-RAT handover to the Wifi offload network or via a reconfiguration that indicates the WLAN AN offload) for offload operation. As part of the signaling, the WTRU may be provided with a list of information to assist it in configuring the client accordingly or in finding the offload AP and to assist in determining the correct AP to connect to. Such information may include one or a combination of the information exchanged during registration (as described above) for the offload service for the WLAN AR Such information may include, for example, WLAN AN identity-related information, security-related information, discovery-related information, and location-related information. This may also be applicable to initiating an offload to a WLAN AP, wherein the network indicates to the WTRU the information required to search and connect to a WLAN AP. The WLAN WTRU may activate a Wifi module following the reception of control signaling from the cellular system that initiates the Wifi offload service.

In another example embodiment, a cellular system may use the localized application principles and framework described herein to realize mobility management for the purpose of handling WLAN WTRU mobility across a, for example, heterogeneous deployment of smaller cells that may be used to offload user data from the cellular network. This embodiment may also be applicable to Home eNB, Home NBs and other types of small cell and pico-cell deployments.

In an embodiment, a WTRU may send feedback related to the signal strength of a current WLAN AN, especially if related to disconnecting. A trigger may stop the Wifi offload service. The trigger may trigger, for example, some form of reselection for another offload server by a cellular network. The WTRU may send feedback related to signal strength of a visible WLAN AP (passive scanning).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) comprising:
a processor configured to send, to a cellular network, a registration message, wherein the registration message includes a request for information associated with a local service and a network name associated with the local service, wherein the local service is associated with an application session; and
a transceiver configured to receive, from the cellular network based on the registration message and location information of the WTRU, an indication of whether local service is available and tracking area information for the local service;
the processor configured to determine, based on the tracking area information for the local service, whether the WTRU is in an area of the local service; and
the processor and the transceiver configured to initiate communication over the application session based on a determination that the WTRU is in the area of the local service.

2. The WTRU of claim 1, wherein a local application is associated with the local service and the WTRU receives configuration information that associates the local service with the local application.

3. The WTRU of claim 1, wherein the WTRU initiates communication in the area of the local service based on the determination.

4. The WTRU of claim 1, wherein the WTRU is subscribed to the local service.

5. The WTRU of claim 1, wherein the determination is based on a current location determined by the WTRU.

6. The WTRU of claim 1, wherein the transceiver is further configured to receive, with a radio network temporary identifier (RNTI), scheduling information for the local service.

7. The WTRU of claim 1, wherein the transceiver is configured to transmit a discovery signal for other local services in a list stored by the WTRU.

8. A method performed by a wireless transmit/receive unit (WTRU), the method comprising:
sending, to a cellular network, a registration message, wherein the registration message includes a request for information associated with a local service and a network name associated with the local service, wherein the local service is associated with an application session;
receiving, from the cellular network based on the registration message and location information of the WTRU, an indication of whether the local service, is available and tracking area information for the local service;
determining, based on the tracking area information for the local service, whether the WTRU is in an area of the local service; and
initiating communication over the application session based on a determination that the WTRU is in the area of the local service.

9. The method of claim 8, wherein a local application is associated with the local service and the WTRU receives configuration information that associates the local service with the local application.

10. The method of claim 8, wherein the WTRU initiates communication in the area of the local service based on the determination.

11. The method of claim 8, wherein the WTRU is subscribed to the local service.

12. The method of claim 8, wherein the determination is based on a current location determined by the WTRU.

13. The method of claim 8 further comprising receiving, by the WTRU with a radio network temporary identifier (RNTI), scheduling information for the local service.

14. The method of claim 8 further comprising transmitting, by the WTRU, a discovery signal for other local services in a list stored by the WTRU.

* * * * *